United States Patent [19]
Oki et al.

[11] Patent Number: 5,581,345
[45] Date of Patent: Dec. 3, 1996

[54] CONFOCAL LASER SCANNING MODE INTERFERENCE CONTRAST MICROSCOPE, AND METHOD OF MEASURING MINUTE STEP HEIGHT AND APPARATUS WITH SAID MICROSCOPE

[75] Inventors: Hiroshi Oki; Jun Iwasaki, both of Yokohama; Takashi Shionoya, Kawasaki; Yutaka Iwasaki, Yokohama; Keiji Matsuura, Kawasaki, all of Japan

[73] Assignee: Nikon Corporation, Tokyo, Japan

[21] Appl. No.: 364,709

[22] Filed: Dec. 28, 1994

Related U.S. Application Data

[63] Continuation-in-part of Ser. No. 199,727, Feb. 22, 1994, abandoned, and Ser. No. 314,940, Sep. 29, 1994, which is a continuation of Ser. No. 27,260, Mar. 8, 1994, Pat. No. 5,205,243, which is a continuation of Ser. No. 26,071, Mar. 4, 1993, abandoned, which is a continuation of Ser. No. 801,413, Dec. 2, 1991, abandoned, said Ser. No. 199,727, is a continuation-in-part of Ser. No. 26,071.

[30] Foreign Application Priority Data

| Dec. 3, 1990 | [JP] | Japan | 2-400212 |
| Mar. 27, 1991 | [JP] | Japan | 3-063107 |
| Nov. 7, 1991 | [JP] | Japan | 3-290293 |
| Feb. 19, 1993 | [JP] | Japan | 5-030158 |
| Dec. 28, 1993 | [JP] | Japan | 5-335672 |
| Dec. 28, 1993 | [JP] | Japan | 5-335673 |
| May 13, 1994 | [JP] | Japan | 6-099450 |
| Oct. 19, 1994 | [JP] | Japan | 6-253666 |

[51] Int. Cl.⁶ ............................................. G01B 11/00
[52] U.S. Cl. ......................................... 356/4.01; 356/359
[58] Field of Search .......................... 356/359, 4.01

[56] References Cited

U.S. PATENT DOCUMENTS

| 4,714,348 | 12/1978 | MaKosch | 356/359 |
| 4,978,219 | 12/1990 | Bessho | 356/359 |
| 5,390,023 | 2/1995 | Biegen | 356/359 |
| 5,392,116 | 2/1995 | MaKosch | 356/359 |

FOREIGN PATENT DOCUMENTS

| 0489580 | 6/1992 | European Pat. Off. |
| 0611946 | 8/1994 | European Pat. Off. |
| 3-278009 | 12/1991 | Japan |
| 4-252444 | 9/1992 | Japan |
| 6-94999 | 4/1994 | Japan |

OTHER PUBLICATIONS

Ooki et al, "A novel type of laser scanning microscope: theoretical considerations," *Optics Communications*, 85 (1991) 177–182.

Iwasaki et al, "Laser Scanning Mode Interference Contrast (Lasmic) Microscope Using LiNbO₃ Waveguide Device," *Proceedings OIDTA 2nd Intl. Forum*, Naha, Okinawa, Japan, Jan. 8–10, 1992.

(List continued on next page.)

*Primary Examiner*—Mark Hellner
*Attorney, Agent, or Firm*—Shapiro and Shapiro

[57] ABSTRACT

A confocal laser scanning mode interferene contrast microscope comprises a laser source, an illuminating optical system for condensing a light beam from the laser source and forming a light spot on an object to be examined, a condensing optical system for condensing the light beam from the object to be examined on a detecting surface, a detecting device for detecting the light beam condensed on the detecting surface, the detecting device having a substrate formed with a channel waveguide and two light detecting elements, the channel waveguide having a double mode channel waveguide having an entrance end surface on the detecting surface and a waveguide fork which forks the double mode channel waveguide into two channel waveguides, the two detecting elements detecting lights propagated through the two channel waveguides, a scanning device for moving the object to be examined and the light spot relative to each other, and a signal processing device for producing differential information of the object to be examined by the detection signals of the detecting elements.

76 Claims, 23 Drawing Sheets

OTHER PUBLICATIONS

Alferness, "Efficient waveguide electro-optic TE⇌TM mode converter/wavelength filter," *Appl. Phys. Lett.* 36(7), 1 Apr. 1980, pp. 513–515.

Suematsu et al, "Fundamental transverse electric field ($TE_O$) mode selection for thin–film asymmetric light guides," *Appl. Phys. Lett.*, vol. 21, No. 6, 15 Sep. 1972, pp. 291–293.

Kumar et al, "Performance of a dual–mode–single–mode waveguide coupler as a modal filter," *Applied Optics*, vol. 31, No. 24, 20 Aug. 1992, pp. 5092–5095.

Wei et al, "Novel TE–TM mode splitter on lithium niobate using nickel indiffusion and proton exchange techniques" *Electronics Letters*, vol. 30, No. 1, 6 Jan. 1994, pp. 35–37.

Haruna et al, "An Efficient TE–TM Mode Converter Using a Z–Propagation $LiNbO_3$ Waveguide," *Transactions of the IECE of Japan*, vol. E69, No. 4, Apr. 1986, pp. 418–419.

*O Plus E*, No. 155, pp. 67–72 (Oct. 1992).

12 nm 30 nm

CONFOCAL LASER SCANNING MODE INTERFERENCE CONTRAST MICROSCOPE, AND METHOD OF MEASURING MINUTE STEP HEIGHT AND APPARATUS WITH SAID MICROSCOPE

This application is a continuation-in-part of application Ser. No. 08/199,727 filed Feb. 22, 1994, now abandoned, which is a continuation-in-part of application Ser. No. now abandoned 08/026,071 filed Mar. 4, 1993, which is a continuation of application Ser. No. 07/801,413 filed Dec. 2, 1991 now abandoned. This application is also a continuation-in-part of application Ser. No. 08/314,940 filed Sep. 29, 1994 abandoned, which is a continuation of application Ser. No. 08/027,260 now U.S. Pat. No. 5,205,243 filed Mar. 8, 1994, which is a continuation of said application Ser. No. 08/026,071 filed Mar. 4, 1993 abandoned, which, as previously noted, is a continuation of application Ser. No. 07/801,413 filed Dec. 2, 1991 abandoned.

BACKGROUND OF THE INVENTION

1. Field of the Invention

This invention relates to a confocal laser scanning mode interference contrast microscope, a method of measuring minute step heights on an object, and an apparatus using the microscope therefor.

2. Related Background Art

A confocal laser scanning microscope has the advantage that its depth of focus is very shallow, and is going to be used for various applications. Specifically, it has a laser source, an illuminating optical system for condensing a light beam from the laser source on an object to be examined and forming a light spot, a condensing optical system for condensing a light beam from the object to be examined on a detecting surface, detecting means for detecting the light team condensed on the detecting surface, and scanning means for moving the light spot relative to the object to be examined. The microscope condenses the laser beam on the object to be examined and detects the light on the detecting surface as well through a pin-hole opening.

To obtain a differential interference contrast image by the use of such a confocal laser scanning microscope, use can be made of the construction of a differential interference device in a conventional popular optical microscope. However, this is a complicated construction and moreover, requires a special objective lens of little distortion, a Nomarski prism, a wavelength plate, etc. The manufacture of various optical elements at high accuracy is difficult, and this has led to a high cost of the apparatus.

Generally, there have been utilized scan-type electron microscopes or probe-type microscopes in order to quantifiably measure minute step heights formed on an object in nanometer order. Also, atomic force microscopes (AFM) have begun to be utilized recently.

However, the scan-type electron microscopes and atomic force microscopes are expensive and the handling of those is difficult. In the probe-type microscopes, a probe is brought into contact with the surface of the object for the measurement, so the object is liable to be damaged and the probe is often broken, necessitating replacement of the probe often. Consequently, it is also disadvantageous from the viewpoint of the cost.

Therefore, the inventors of the present invention utilized a phase contrast microscope and a differential interference contrast microscope and tried to obtain the amount of step heights from image outputs of these microscopes quantifiably. This method is not impossible in principle but it is very difficult to establish a formula for the method from the wave optical image formation theory. Also, the principle for measuring step heights by utilizing the differential interference contrast microscope is disclosed page 70 in O plus E published in October, 1992, wherein a signal corresponding to the slope of the step structure is obtained when the width (not height) of the step structure on the object (phase object) is sufficiently larger than a light spot. That is, the method is applicable to the object having the step heights with gentle slopes, in which the measurement of the step heights can be performed without taking the effect of diffraction into consideration. Also, the effect of diffraction of the optical system is not taken into consideration. Accordingly, the resolution for an object having minute and narrow step heights is considerably reduced.

SUMMARY OF THE INVENTION

It is an object of the present invention to provide a confocal laser scanning mode interference contrast microscope which is compact and easy to manufacture.

It is another object of the present invention to provide a method and an apparatus capable of measuring step heights on an object having a narrower width than a light spot with high resolution without being in contact with the object.

The inventors of the present invention found that minute step heights on an object (a phase object) can be measured by image signals of a microscope even though the width of the minute step heights is smaller than that of a light spot. Thereby, it is possible to obtain a measuring apparatus which is capable of measuring minute step heights without being in contact with the object and which is inexpensive and easy to handle as compared with scan-type electron microscopes and atomic force microscopes. Further, it was found that if a confocal laser scanning mode interference contrast microscope provided with a waveguide in the detecting system is utilized, by utilizing two detecting devices, a step height can be calculated from output signals from the detecting devices without carrying out measurement in various points. Also, in the present invention, its quantification was endorsed definitely by the wave optical image formation theory and so it is possible to measure step heights from image signals quantifiably.

For the above objects, the present invention uses a waveguide device and obtains a mode interference contrast image by a principle entirely different from the conventional construction.

That is, in a confocal laser scanning microscope, substrate formed with a channel waveguide is provided for light detecting means, and said channel waveguide has a double mode waveguide region having an entrance end surface on said detecting surface and a waveguide fork which forks said double mode waveguide into two channel waveguides, and is further provided with detecting elements for detecting lights propagated through the two channel waveguides.

Also, in a confocal laser scanning microscope of the so-called epi-illumination type using a common objective lens for an illuminating optical system and a condensing optical system, it is possible provide a waveguide for illumination on the wave guide substrate of detecting means to thereby make them integral with each other. In this case, it is preferable that the channel waveguide on the substrate be made into a construction having a double mode waveguide region having an end surface on said detecting surface and a waveguide fork which forks said double mode waveguide into three channel waveguides, and that an illuminating light beam from a laser source be directed to the middle one of the three channel waveguides to thereby form a light spot on object to be examined through an objective lens, and further that provision be made of detecting elements for detecting lights propagating through the two outer ones of the three channel waveguides.

In the present invention, a laser spot reflected by the object to be examined becomes a spot image again on the detecting surface by a condensing optical system comprising an objective lens, an imaging lens, etc. When at a position where this spot image is formed, the double mode channel waveguide is disposed so that the center of the spot image and the center of the double mode channel waveguide may coincide with each other. If the amplitude distribution of the spot image in the widthwise direction of the waveguide is an even function when the center of the spot is the origin, only an even mode is excited in the double mode waveguide. In the other cases, both of even and odd modes are excited. If a waveguide fork region forking into channel waveguides is provided subsequently to the double mode region, when only the even mode is excited, equal quantities of light are distributed in the two forks, and in the other bases, the interference between the even mode and the odd mode occurs and therefore, the quantities of light distributed in the two forks are generally not equal. Generally, if in the object to be examined, there are inclinations, i.e., a physical inclination as well as all inclinations such as refractive index inclinations which vary the length of the optical path and the inclination of light transmittance distribution or light reflectance distribution, the amplitude distribution of the spot image will have an odd function component. Then, both even and odd modes will be excited in the double mode waveguide and as a result, the quantities of light distributed into the two forks will not be come equal. Accordingly, by detecting the difference between the quantities of light propagating through the two forks, the microscopic inclination of the object to be examined can be detected.

Let it be assumed that the angle of inclination of the object to be examined is $\theta$ and $\sin\theta=\alpha$. If the amplitude distribution of the laser spot when he inclination is 0 is $u(x)$ and the field distribution of each eigen mode of the double mode waveguide $fe(x)$ and $fo(x)$ with respect to the even and odd modes, respectively, $u(x)$ and $fe(x)$ are even functions and $fo(x)$ is an odd function. With $k=2\pi/\lambda$ ($\lambda$: wavelength), the amplitude distribution of the laser spot $u\alpha(x)$ when there is an inclination is expressed as $$u_\alpha(x) \simeq u(x)\exp(ik_\alpha x) \qquad (1)$$
$$= u(x)[\cos(k_\alpha x) + i\sin(k_\alpha x)].$$

Here, the coupling efficiency $\eta_e$ of the even mode is $$\eta_e = \frac{\int u(x)\cos(k_\alpha x)fe^*(x)dx}{\sqrt{\int |u(x)|^2 dx \int |fe(x)|^2 dx}}, \qquad (2)$$

while the coupling efficiency $\eta_o$ of the odd mode is $$\eta_o = \frac{i\int u(x)\sin(k_\alpha x)fo^*(x)dx}{\sqrt{\int |u(x)|^2 dx \int |fo(x)|^2 dx}}. \qquad (3)$$

If the integration range is suitably chosen and $|k\alpha x|<<2\pi$ within this range,
$\cos(k\alpha x)\approx 1$, $\sin(k\alpha x)\approx k\alpha x$
and hence, from the fact that $u(x)$, $fo(x)$ and $fe(x)$ are predetermined functions, it can be seen that
$\eta_e\approx$constant, $\eta_o\propto i\alpha$. (4)

If $C_1$ and $C_2$ are real constants and $\phi$ is the phase difference between the even and odd modes at the point of ranch-off, the variation in the intensity of light by the interference between the even mode and the odd mode is $$I\propto|\eta_e\pm i\eta_o\exp\{i\phi\}|^2=|C_1\pm i\alpha C_2\exp\{i\phi\}|^2 \qquad (5)$$

Consequently, if $\exp\{i\phi\}$ is selected to $\exp\{i\phi\}=\pm i$, equation (5) substantially becomes $$I=C_1^2\mp 2\alpha C_1 C_2 \qquad (6)$$

and a variation in the intensity proportional to $\alpha$ is obtained, and a so-called differential image can be obtained.

Accordingly, to obtain such a differential image, it is necessary that at the point of branch-off between the double mode and the single mode, a phase difference an odd number times as great as 90° to be brought about between the two modes. For this reason, if the well-known "fully coupled length" of the two modes (the length for which the phase difference between the even and odd modes is 180°) is Lc, it is preferable that the length L of the double mode region be $$L=Lc(2m+1)/2 \ (m=0, 1, 2, \ldots), \qquad (7)$$

Note that expression (1) takes the inclination of the object into consideration and thus, supposes a phase object. The present invention is applicable not only to a phase object, but also an intensity modulation object (an object of which the light transmittance or reflectance varies). Such an object, for example, with $\alpha$ as a real number, can be expressed as $$u\alpha(x)=u(x)(1+\alpha x). \qquad (8)$$

At this time, obviously, $$\eta_e\approx\text{constant}, \eta_o\propto\alpha \qquad (9)$$

and hence, t is when there is brought about a phase difference integer times as great as 180° between the two modes, that is, when $\exp\{i\phi\}=\pm 1$ is placed in equation (5), that the ratio of quantity of light distributed in the two forks becomes greatest by the interference between the even and odd modes.

Consequently, to see the differential image of an intensity modulation object, it is preferable that the length L of the double mode region be integer time as great as the coupled length Lc, i.e., $$L=mLc \ (m=1, 2 \ldots) \qquad (10)$$

That is, depending on how the length L of the double mode region is assumed, the differential image of only the phase modulating portion or the intensity modulating portion of the object can be seen.

Where the substrate has an electro-optical effect, a voltage can be applied to the double mode region through an electrode disposed on this region, thereby varying the fully coupled length Lc. Accordingly, even if the length of the double mode region is a predetermined value L, it is possible to satisfy both of equation (7) and equation (10) above by the adjustment of the voltage, and it is possible to make the mechanical length of the double mode region constant and yet obtain the phase information and amplitude information of the object independently of each other by the electro-optical effect.

That is, by applying a voltage to the electrode disposed on the double mode region of the channel waveguide, the fully coupled length Lc in the double mode region can be varied into $Lc_1$ and $Lc_2$, and by a adopting a construction in which for the predetermined length L of the double mode region, $$\left.\begin{array}{ll} L = mLc_1 & (m=1, 2, \ldots 2.) \\ L = Lc_2(2m+1)/2 & (m=0, 1, 2, \ldots) \end{array}\right\} \quad (11)$$

is established, in the case of $Lc_1$, the amplitude information of the object can be obtained as shown in equation 10) above, and in the case of $Lc_2$, the phase information of the object can be obtained as shown in equation (7) above.

By the principle of the mode interference contrast microscope using the channel waveguide as described above, it is possible to obtain the differential information in the widthwise direction of the double mode channel waveguide, but the direction of the differential information is restricted to this direction. So, by combining two detecting means so that the widthwise directions of the double mode waveguides thereof may be orthogonal to each other, it becomes possible to obtain differential information in a desired direction without rotating the object to be examined and the microscope relative to each other. That is, the differential information in the directions orthogonal to each other can be obtained from each detecting means, and by combining the signals from the two detecting means, it becomes possible to observe the differential image as a contrast difference in any direction.

Specifically, when the signals obtained in the first and second detecting means are $I_1$ and $I_2$, respectively, and if the combined signal of the two is I, signal processing is effected such that $$I=I_1\sin\theta+I_2\cos\theta \quad (12)$$

Here, by varying $\theta$ within the range of $0-\pi$, the direction in which the contrast of the differential image is created can be changed, and a differential image having a contrast in a desired direction can be obtained without the sample and the microscope being rotated relative to each other. In practical use, it is preferable to suitably vary the value of $\theta$ and choose such a value of $\theta$ that the differential image of the object to be examined can be expressed most accurately while observing the monitor image of the confocal laser scanning microscope.

FIG. 23 shows the basic structure of a light information detecting device used in the present invention. The light information detecting device is constituted by a double-mode channel waveguide 389 which excites zeroth-order mode light and first-order mode light in accordance with light incident on an incident end face 382, and is formed on a substrate 81, a split region 383 which is connected to the double-mode channel waveguide 389 and splits light propagating from the double-mode channel waveguide 389, two light-distribution single mode channel way guides 386 and 387 for guiding light components it by the split region 383, and photodetectors 384 and 385 for detecting light components emerging from the light-distribution single mode channel waveguides 386 and 387. In FIG. 23, light is distributed into the light distribution single mode channel waveguides 386 and 387, and light components emerging therefrom are detected by the photodetectors 384 and 385, so as to detect the intensity distribution of light propagating through the double mode channel waveguide 389. However, a light detection array such as a two-split photodetector, PSD, linear sensor, or the like may be directly connected to the double mode channel waveguide 389 without arranging the light-distribution single mode channel waveguides 386 and 387 to directly detect light emerging from the double mode channel waveguide 389, thus similarly detecting the intensity distribution of light.

A signal intensity $I_0$ obtained from one of the two photodetectors shown in FIG. 23 is expressed as follows in correspondence with the length of the double mode region given by equations (7) and (10):

In case of equation (7):

$$I_0=C_0^2+(-1)^m 2\alpha C_0 C_1 \quad (13)$$

In the case of equation (10):

$$I_0=C_0^2-(-1)^m 2a C_0 C_1 \quad (14)$$

where constants $C_0$ and $C_1$ represent values (excitation efficiency) proportional to the amplitudes of the zeroth-order light and the first-order mode light which propagate through the double mode waveguide. When both the phase information and the amplitude information of light incident on the double mode channel waveguide are to be observed, the length of the double mode region can be selected to be a length other than those given by equations (7) and (10). At this time, the signal intensity $I_0$ obtained from the photodetector becomes an intensity obtained by adding terms in equations (13) and (14) at a predetermined ratio in accordance with the length of the double mode region.

In the light information detecting device, the gradient of the phase or amplitude to be detected is small, and the signal component amount based on the gradient becomes very small as compared to the incident light amount, a minimum value of the phase or amplitude which can be detected by the light information detecting device undesirably becomes large, and the gradient of the phase or amplitude to be detected cannot often be accurately detected.

In order to solve the above problem, according to another aspect of the present invention, there is provided a light information detecting device comprising: a substrate; a double mode channel waveguide formed on the substrate, the double mode channel waveguide having an incident end face which receives incident light, and zeroth-order mode light and first-order mode lighting excited in the double mode channel waveguide in accordance with light incident on the incident end face; a photodetecting portion for detecting an intensity distribution of light propagating through the double mode channel waveguide; and a first device for selectively removing the zeroth-order mode light excited in the double mode channel waveguide.

The light information detecting device preferably further comprises: a split region which splits light propagating through the double mode channel waveguide and is formed on the substrate; and two light-distribution channel waveguides which guide light components split by the split region and are formed on the substrate. In this case, the photodetecting portion detects light components respectively emerging from the two light-distribution channel waveguides.

The first device preferably comprises: a TE/TM mode converter which is arranged on the double mode channel waveguide, and performs selective TE/TM mode conversion of a direction of polarization of the zeroth-order mode light excited in the double mode channel waveguide; and a polarization separation device which is arranged between the TE/TM mode converter and the photodetecting portion and blocks the zeroth-order mode light, which is TE/TM mode-converted by the TE/TM mode converter, so that the zeroth-order mode light does not reach the photodetecting portion.

The TE /TM mode converter preferably comprises an electrode which is arranged on the double moded channel waveguide, and which has a periodic structure.

The polarization separation device preferably comprises a polarization plate which is arranged in front of the photodetecting portion.

The polarization separation device may comprise a metal plate which is arranged on the light-distribution channel waveguide.

Furthermore, in the light information detecting device which comprises: a split region which splits light propagating through the double-moded channel waveguide and is formed on the substrate, and two light-distribution channel waveguides which guide light components split by the split region and are formed on the substrate, the polarization separation device may comprise: two polarization separation double-moded channel waveguides, which are respectively connected to the first light-distribution channel waveguides, have predetermined lengths, and are formed on the substrate; two second split regions which respectively split light components propagating through the polarization separation double-moded channel waveguides and are formed on the substrate; and four second light-distribution channel waveguides which respectively guide light components split by the second split regions and are formed on the substrate. In this case, the photodetecting portion detects light components emerging from the two second light-distribution channel waveguides which guide light including the first-order mode light of the four second light-distribution channel waveguides.

Alternatively, the first device may comprise a coupling channel waveguide which is formed on the substrate, is arranged in the vicinity of and to be substantally parallel to the double moded channel waveguide, and can be coupled to the zeroth-order mode light propagating through the double moded channel waveguide.

In this case, it is preferable that the effective refractive index of the coupling channel waveguide with respect to light propagating therethrough be substantially equal to an effective refractive index of the double moded channel waveguide with respect to the zeroth-order mode light propagating therethrough.

It is also preferable that the substrate have an electro-optical effect, and an electrode for applying an electric field to the coupling channel waveguide be arranged on or in the vicinity of the coupling channel waveguide.

Furthermore, in the light information detecting device which comprises: a split region which splits light propagating through the double-moded channel waveguide and is formed on the substrate and three light-distribution channel waveguides which guide light components split by the split region and are formed on the substrate, the first device may comprise: a first TE/TM mode converter which is arranged on the double-moded channel waveguide, and which performs selective TE/TM mode conversion of a direction of polarization of the zeroth-order mode light excited in the double-moded channel wave guide; and a second TE/TM mode converter which is arranged on the double-moded channel waveguide, and which performs selective TE/TM mode conversion of a direction of polarization of the first-order mode light excited in the double-moded channel waveguide. In this case, the photodetecting portion detects light components emerging from at least the two outer light-distribution channel waveguides of the three light-distribution channel waveguides, and the two outer light-distribution channel waveguides guide only light which has a direction of polarization perpendicular to the direction of polarization of light incident on the double-moded channel waveguide. The middle light-distribution channel waveguide of the three light-distribution channel waveguides guides only light has a direction of polarization perpendicular to the direction of polarization of light propagating through the two outer light-distribution channel waveguides.

Alternatively, the first device may comprise: a TE/TM mode converter which is arranged on the double mode channel waveguide, and which performs selective TE/TM mode conversion of a direction of polarization of the zeroth order mode light excited in the double-mode channel waveguide. In this case, the photodetecting portion detects light components emerging from at least the two outer light-distribution channel waveguides of the three light-distribution channel waveguides, and the two outer light-distribution channel waveguides guide only light which has the same direction of polarization as the direction of polarization of light incident on the double-mode channel waveguide.

According to another aspect of the present invention, there is provided a light information detecting device comprising: a substrate; a double-mode channel waveguide formed on the substrate, the double-mode channel waveguide having an incident end face which receives incident light, and zeroth-order mode light and first-order mode light being excited in the double-mode channel waveguide in accordance with light incident on the incident end face; a photodecting portion for detecting an intensity distribution of light propagating through the double mode channel waveguide; and a second device for selectively removing light which propagates near the center of the double mode channel waveguide.

The light information detecting device according to this aspect preferably further comprises: a split region which splits light propagating through the double mode channel waveguide and is formed on the substrate; and two light-distribution channel waveguides which guide light components split by the split region and are formed on the substrate. In this case, the photodetecting portion detects light components respectively emerging from the two light-distribution channel waveguides.

The second device preferably comprises a stripe-shaped metal plate which has a width smaller than a width of the double mode channel waveguide, and is arranged on a surface of the double mode channel waveguide that the center thereof coincides with the center of the double mode channel waveguide.

Alternatively, the second device may comprise a selective removal channel waveguide which has a width smaller than a width of the double mode channel waveguide, and is connected to the double mode channel waveguide so that the center thereof coincides with the center of the double mode channel waveguide.

In this case, the width of the selective removal channel waveguide is preferably a width with which the first-order mode light propagating through the double mode channel waveguide is cut off. Furthermore, the device preferably further comprises a photodetector for detecting light emerging from the selective removal channel waveguide.

The principle of the improved light information detecting device according to the present invention will be explained below.

In the basic light information detecting device (FIG. 23), the gradient of the phase or amplitude detected by one of the two photodetectors 384 and 385 is obtained as a sum of a component (signal component) proportional to a product of the gradient ($\alpha$) of the phase or the gradient (a) of the amplitude and a product ($C_0 C_1$) of values proportional to the amplitudes of the zeroth-order mode light and the first-order mode light, and a component ($C_0^2$: offset component) proportional to a square of the amplitude of the zeroth-order mode light, as shown in equation (13) or (14). In the output from the other photodetector, the offset component is in phase with that in the former output, and the signal component has a phase opposite to that in the former output. Therefore, by calculating a difference between the outputs from the two photodetectors a signal from which the offset components as in-phase components are suppressed can be obtained. In in order to detect a signal of, e.g., the gradient of the amplitude or phase, a signal component obtained by calculating the difference between the outputs from the two photodetectors must be larger than various noise components such as heat noise generated by the photodetectors.

The present inventors found that the amplitude of the zeroth-order mode light in the double mode channel waveguide in accordance with light incident on the double mode channel waveguide was considerably larger than that of the first-order mode light. More specifically, the output signal from one photodetector is a signal in which a small signal component is superposed on a very large offset component. Therefore, when the gradient of the phase or amplitude of an object to be detected becomes small, a signal is buried in noise components and can no longer be detected. For this reason, in order to decrease the gradient of a minimum phase or amplitude which can be detected by the light information detecting device, the S/N ratio of light information detection in the light information detecting device must be increased.

As is apparent from equation (13) or (14), in order to increase the S/N ratio of light information detection, the zeroth-order light can be suppressed by the device side before execution of electrical signal processing. The present invention is based on such an idea. More specifically, the device comprises the first device for selectively removing the zeroth-order mode light to suppress the zeroth-order mode light.

A channel waveguide is formed on a substrate such as a lithium niobate substrate consisting of a material having an electro-optical effect and an optical anisotropy and an electric field is applied in a specific direction of the channel waveguide. With this structure, TE mode light and TM mode light, which propagate through the channel waveguide, can be coupled to each other, and the direction of polarization of light excited in the channel waveguide can be rotated from the T mode to the TM mode or vice versa. The TE and TM modes are two modes having orthogonal polarization states. For example, when light propagates through a double mode channel waveguide 392 in FIG. 24, light whose amplitude direction of the electric field coincides with the vertical direction of the plane of the drawing of FIG. 24 is TM mode light, an light whose amplitude direction of the electric field coincides with the horizontal direction of the plane of the drawing of FIG. 24 is TE mode light. Such a device is known as a TE/TM mode converter, and an example is described in R. C. Alferness, Appl. Phys. Lett. 36, (1980) 513.

In this reference, a channel waveguide is formed on a Y-propagation lithium niobate substrate by a Ti-diffusion process, and an interdigital electrode having a periodic structure is formed on the channel waveguide. With this device, an electric field is applied in the direction of the Y-axis of the lithium niobate substrate upon application of a voltage.

In the TE/TM mode converter with the above-mentioned structure, when the effective refractive index difference |NTM−NTE| between the TE and TM mode (NTM: the effective refractive index of the TM mode NTE: the effective refractive index of the TE mode), and the periodic interval $\Lambda$ of the interdigital electrode have the following relationship therebetween, a phase matching condition between TE and TM mode light components can be obtained, and mode conversion between these mode occurs:

$$2\pi|NTM-NTE|/\lambda = 2\pi/\Lambda \tag{15}$$

where $\lambda$ is the wavelength of light propagating through the waveguide.

The zeroth- and first-order mode light components, which propagate through the double mode waveguide, have different effective refractive indices although they have same polarization state. Therefore, the shape of the interdigital electrode can be designed to satisfy equation (15) for only the zeroth-order mode, and in the case, TE/TM mode conversion can be performed or only the zeroth-order mode. On the other hand, light separation between the TE and TM modes is achieved by normal polarization separation, and TE mode light and TM mode light can be easily separated arranging various members (polarization separation members) such as a polarization plate which shields unnecessary light (e.g., TM mode light) and allows necessary light (e.g., TE mode light) to pass therethrough.

The present invention realizes a novel function of suppressing zeroth-order mode light in a double mode channel waveguide by combining the TE/TM conversion technique selectively performing TE/TM mode conversion of only the zeroth-order mode light, and the polarization separation technique for separating TE and TM mode light components and suppressing the TE/TM mode-converted zeroth-order mode light. More specifically, as the first member for selectively removing the zeroth-order mode light, the TE/TM mode converter and the polarization separation member are arranged. As a result, the direction of polarization of only the zeroth-order mode light excited in the double mode channel waveguide is rotated, and thereafter, only the TE/TM mode-converted zeroth-order mode light is blocked by the polarization separation device so as not to reach the photodetecting portion, thereby suppressing the zeroth-order mode light and improving the S/N ratio.

On the other hand, by adjusting the voltage applied to the interdigital electrode, the conversion efficiency of the TE/TM mode converter can be changed. More specifically, when the zeroth- and first-order mode light components propagate through the double mode channel waveguide, the ratio between the TE and TM modes of the zeroth-order mode light and that between the TE and TM modes of the first-order mode light can be arbitrarily adjusted by arranging a TE/TM mode converter for the zeroth-order mode light and a TE/TM mode converter for the first-order mode light on the double mode channel waveguide. Therefore, of the zeroth- a first-order mode light components, which propagate in the TE or TM mode, some light components of the zeroth-order mode light are TE/TM mode-converted, and zeroth-order mode light components which not TE/TM mode-converted and the first-order mode light are detected, or some light components of the zeroth-order mode light and the first-order mode light are TE/TM mode-converted, and the TE/TM mode-converted light components are detected, thereby suppressing the zeroth-order mode light. In this manner, in order to detect only the TM or TE mode light, in three light-distribution channel waveguides for guiding light components distributed by a split region connected to the double mode channel waveguide, the two outer light-distribution channel waveguides are designed to guide only light (mode light including a large amount of first-order mode light) in one of the TE and TM modes, and the middle light-distribution channel waveguide is designed to guide a large amount of zeroth-order mode light, so that the two outer light-distribution channel waveguides can efficiently detect a signal from which the zeroth-order mode light is suppressed.

Furthermore, the present inventors made extensive studies, and found that the first member for selectively removing only zeroth-order mode light could be achieve by a method different from that described above.

In general, it is well known that light power shifts from one optical waveguide to the other waveguide by coupling of the modes propagating through adjacent optical waveguides, and a device which applies this technique is known as a directional coupler. The shift of light power is controlled by the difference between the equivalent refractive indices of the coupled propagating through the optical waveguides, the interval, and the length of the coupled region.

The zeroth- and first-order mode light components which propagate through the double mode channel waveguide have different equivalent refractive indices. Therefore, when a coupling channel waveguide is arranged in the vicinity of the double mode channel waveguide, and (1) the equivalent refractive index of the coupling channel, (2) the interval between the coupling channel waveguide and the double mode channel waveguide, and (3) the length of the coupling channel waveguide are appropriately chosen, only the zeroth-order light can be select power-shifted to the coupling channel waveguide. Preferably, when the equivalent refractive index of the coupling channel waveguide is set to be almost equal to that of the zeroth-order mode light, coupling of the zeroth-order mode light between the double mode channel waveguide and the coupling channel waveguide becomes stronger than that of the first-order mode light. Therefore, the zeroth-order mode light power-shifts by a shorter distance than that required or the first-order mode light. FIG. 19 shows the principle of the power shift. In FIG. 19, the centroids of the distributions of the powers of the first- and zeroth-order mode light components, which propagate through a double mode channel waveguide 358, are respectively expressed by a broken curve 359 and a solid curve 360. Both the mode light components shift from the left to the right in FIG. 19. In a region where the double mode channel waveguide 358 exists, the centroids of the powers of the zeroth- and first-order mode light components are located at the center of the double mode channel waveguide, and overlap each other. However, when a coupling channel waveguide 361 appears in the vicinity of the light, the zeroth- and first-order mode light components are coupled to the coupling channel waveguide 361, and power shift begins. When the equivalent refractive index of the coupling channel waveguide 361 is set to be closer to that of the zeroth-order mode light than that of the first-order mode light, the zero order mode light power-shifts in a shorter period the first-order mode light. Therefore, when this length is selected to be a length with the zeroth-order mode light sufficiently power-shifts and almost no first-order mode light power-shifts, only the zeroth-mode light selectively power-shifts to the coupling channel waveguide 361, and is removed. Therefore, when the coupling channel waveguide is arranged as the first device in the vicinity of and to parallel to the double mode channel waveguide in the optical information detection device, zeroth-order mode light excited in the double mode channel waveguide can be selectively removed, and the S/N ratio can be improved. Strictly speaking, a super mode consisting of two waveguides (the channel waveguide 361 and the double mode channel waveguide 358) in FIG. 19 must be given consideration. However, according to A. Kumar et al., Appl. Opt., 31 (1992) 5092, the above simplification is justifiable.

The present invention considered the fact that the mode shapes of the zeroth- and first-order mode light components were largely different from each other, and obtained a new idea of suppressing the zeroth-order mode light by utilizing this fact. FIG. 24 illustrates the intensity distributions observed from a section perpendicular to the propagation direction of the zeroth- and first-order mode light components in the same scale together with the section of the double mode channel waveguide. Note that the amplitudes of the zeroth- and first-order mode light components are set to be almost equal to each other for the sake of simplicity in FIG. 24. As is apparent from FIG. 24, an intensity distribution 393 of the zeroth-order mode light becomes large near the center of the width of the double mode channel waveguide 392 formed on a substrate 391. In contrast, an intensity distribution 394 of the first-order mode light becomes small near the center of the width of the double mode channel waveguide 392.

Therefore, it is obvious that only the zeroth-order mode light can be mainly removed by selectively removing light near the center of the double mode channel waveguide in the light information detecting device. It is well known that light propagating through an optical waveguide can be removed from the optical waveguide by an absorption, split, scattering, or radiation mode or by coupling with a waveguide mode of another optical waveguide. According to the present invention, the second device for selectively removing light near the center of the width of the double mode channel wave guide is arranged by utilizing such knowledge.

The present inventors made further studies and found that when a metal plate having a width smaller than the width of the double mode channel waveguide is arranged as the second device at the center of the surface of the double mode channel waveguide, light near the center of the double mode channel waveguide can be selectively absorbed. The absorption characteristics, when light excited in the optical waveguide is absorbed by the metal plate by arranging the metal plate on the optical waveguide, have polarization dependence, as can be seen from the fact that they are utilized to realize a TE/TM mode converter in, e.g., Y. Suematsu et al., Appl. Phys. Lett., Vol. 21, No. 6 (1972). TM mode light is absorbed more efficiently than TE mode light. However, it is theoretically possible to suppress the TE mode light to a desired amplitude by increasing the length of the metal plate.

Also, the present inventors found that when a selective removal channel waveguide, which has a width smaller than that of the double mode channel waveguide and has a center coinciding width the double mode channel waveguide, is connected, as the second device, to the double mode channel waveguide, only light excited near the center of the double mode channel waveguide can be excited in the selective removal channel waveguide. Therefore, with this method as well, light excited near the center of the double mode channel waveguide can be selectively removed.

Since the present invention adopts the above-mentioned arrangement of the light information detecting device, a phase or amplitude can be accurately detected even when the gradient of the phase or amplitude to be detected is small.

For measuring a minute step height on an object to be examined, an apparatus of the present invention basically comprises a laser source, an illuminating optical system for focusing a light beam from the laser source and forming a light spot on the object, an optical system for focusing the light beam from the object on a detecting surface, and detecting means for detecting the light beam focused on the detecting surface.

The detecting means has a substrate formed with a channel waveguide. The channel waveguide has a double mode channel waveguide region having an entrance end on the detecting surface and at least two branch channel waveguide regions branched from said double mode channel waveguide region. The detecting means further has respective detecting elements for detecting lights propagated through the branch channel waveguides, adding means for adding signals from the detecting elements, subtracting means for obtaining the difference of signals from the detecting elements and calculating means for outputting data of the step height on the object based on the outputs of the adding and subtracting means.

In the above structure, when the fully coupled length of two modes of the double mode region of the channel waveguide is Lc, it is effective that the length L of the double mode channel waveguide is $$L=Lc\,(2m+1)/2\;(m=0,1,2,\ldots),$$

The minute step height measuring apparatus is preferably provided with scanning means for relatively shifting the light spot with respect to the object to be examined. Also, based on the output information $W(s_0)$ of the adding means and the output information $S(s_0)$ of the subtracting means, it is effective to obtain the minute step height $\phi_0$ by the following equation:

$$\phi_0 = C_A \cdot S(s_0)/W(s_0)$$

wherein $C_A$ is a constant which depends on the apparatus.

The method of measuring the minute step height on the object to be examined comprises the steps of forming the light spot on the object by focusing light from the laser source, focusing the light from the object on the detecting surface and detecting the focused light on the detecting surface.

Further the detecting step comprises the steps of detecting the respective intensities of lights from the branch channel waveguides propagated through the double mode channel waveguide from the entrance end surface on the detecting surface, obtaining the difference and the sum of the respective intensity signals and calculating a signal for the minute step height on the object based on the difference signal and the sum signal.

The minute step height measuring method preferably further comprises the step of relatively shifting the light spot with respect to the object.

Although the detecting principle in a confocal laser scanning mode interference contrast microscope using a wave guide is already disclosed by the inventors (Optics communications, 85 (1991), P177), a quantitative relationship between the minute step height on the object and the image signal will be described hereinafter. For simplicity, the description will be restricted to one-dimensional case, but two-dimentionalizational is straight forward given the one-dimensional case. Of course, the discovery of the quantitative relationship is a principal aspect of the present invention. If the amplitude distribution function of the object is $o(x)$, the amplitude distribution function of the laser spot for illuminating the object (even function) is $u(x)$ and the amplitude distribution function of the point image in the image formation optical system from the object to the entrance end surface of the channel waveguide is $K(x)$, the distribution function of the laser spot at the end surface of the channel waveguide $h(x, x_o)$ is given by $$h(x,\,x_0)=\int o(s)u(s-x_0)K(s-x_0-x)ds \qquad (101)$$

wherein s x are coordinates on the object and the entrance surface of the channel waveguide respectively and $x_0$ is the distance between the origin of the coordinates on the object and the center of the laser spot. That is, $x_0$ is varied according to scanning. If the field distribution functions of the zeroth and first modes of the double mode channel waveguide are $f_0(x)$ and $f_1(x)$ respectively, the coupling coefficients of the zeroth and first modes $\eta_0$, $\eta_1$ are $$\eta_0(x_0)=\int h(x,\,x_0)f_0^*(x)dx \qquad (102)$$

and $$\eta_1(x_0)=\int h(x,\,x_0)f_1^*(x)dx \qquad (103)$$

Here, $f_0(x)$ is an even function and $f_1(x)$ is an odd function.

Now the light intensity distribution $I(x_0, t)$ in the double mode channel waveguide is expressed as $$I(x_0,\,t)=|\eta_0(x_0)f_0(t)+\exp[i\theta]\eta_1(x_0)f_1(t)|^2 \qquad (104)$$

Here, t is coordinate system taken in the double mode waveguide so as to be parallel to the X-coordinate. $\theta$ is a phase difference between the zeroth and first modes. Note that $\theta=\pi/2+m\pi$ is optimum when observing phase object, which is already disclosed in the foregoing reference (Optics Communications 85 (1991), 177).

Next, the object is assumed to be a minute phase object as follows:

$$o(x)=a\cdot\exp[i\phi(x)]\approx a\{1+i\phi(x)\}. \qquad (105)$$

Here, $a^2$ is the reflectivity of the object and $\phi(x)$ is the phase distribution of the object due to the uneven surface (unit: radian).

From equations (101) to (105), I $(x_0, t)$ is obtained by $$I(x_0,t) = \{aC_0f_0(t)\}^2 - 2\,a^2 9\,C_0f_0(t)f_1(t) \cdot \qquad (106)$$
$$\iint\phi(s)u(s-x_0)K(s-x_0-x)f_1(x)dsdx.$$

Here, the coefficient $C_O$ is $$C_O=\iint u(s-x_0)K(s-x_0-x)f_0(x)dsdx. \qquad (107)$$

When obtaining the equation (106), quadratic or more terms as to $\phi$ are neglected. The difference signal output $S(x_0)$ is given by $$S(x_0) = \int_{-\infty}^{0} I(x_0,t)dt - \int_{0}^{\infty} I(x_0,t)dt. \quad (108)$$

The fact that $f_0(x)$, $f_1(x)$ are the even and odd functions respectively is taken into consideration and then, the equations (106) and (108), $S(x_0)$ becomes $$S(x_0) = 4a^2 C_o C_t \int_{-\infty}^{0} \phi(s) u(s-x_0) G(s-x_0) ds. \quad (109)$$

Here, $C_t$ and $G(x)$ are $$C_t = \int_{0}^{\infty} f_0(t) f_1(t) dt \quad (110)$$

and $$G(x) = \int_{-\infty}^{\infty} K(x-s) f_1(s) ds. \quad (111)$$

Thereby, the equation (109) becomes $$S(x_0) = 4a^2 C_o C_t \int_{-\infty}^{\infty} \phi(s) PSF(s-x_10) ds. \quad (112)$$

Of course, PSF(x) is PSF(x)=u(x)G(x). (113)

On the other hand, the sum signal output $W(x_0)$ is given by $$W(x_0) = \int_{-\infty}^{\infty} I(x_0,t) dt. \quad (114)$$

From the equation (106), $W(x_0)$ becomes $w(x_0) = a^2 C_0^2 C_w$. (115)
Here, $$C_w = \int_{-\infty}^{\infty} \{f_0(t)\}^2 dt. \quad (116)$$

Now, the minute step height on the object $\phi(s)$ is defined as follows:

$$\phi(s) = 0 \quad s < s_0 \quad (117)$$
$$\phi_0 \quad s \geq s_0$$

The equation (117) is substituted for the equation (112) to be $$S(x_0) = 4a^2 \phi_0 C_0 C_t \int_{s0}^{\infty} PSF(s-x_0) ds. \quad (118)$$

Thereby, $$S(s_0) = 4a^2 \phi_0 C_0 C_t \int_{0}^{\infty} PSF(s) ds. \quad (119)$$

On the other hand, the sum signal output does not depend on $\phi$, and therefore,
$W(s) = a^2 C_0^2 C_w$. (120)

Then, from the equations (119) and (120), $\phi_0$ is obtained by $$\phi_0 = S(s_0) C_w C_0 / \left\{ 4W(s_0) C_t \int_{0}^{\infty} PSF(s) ds \right\}. \quad (121)$$

That is, $\phi_0$ can be simply expressed as $$\phi_0 = C_P \cdot S(s_0)/W(s_0) \quad (122)$$

wherein $$C_p = C_w C_0 / \left\{ 4C_t \int_{0}^{\infty} PSF(s) ds \right\}.$$

Thus, $\phi_0$ can be obtained simply by multiplying a ratio of the difference signal output $S(s_0)$ to the sum signal out $W(s_0)$ by the constant $C_p$ determined by the apparatus.

DESCRIPTION OF THE PREFERRED EMBODIMENTS

Figure 1:
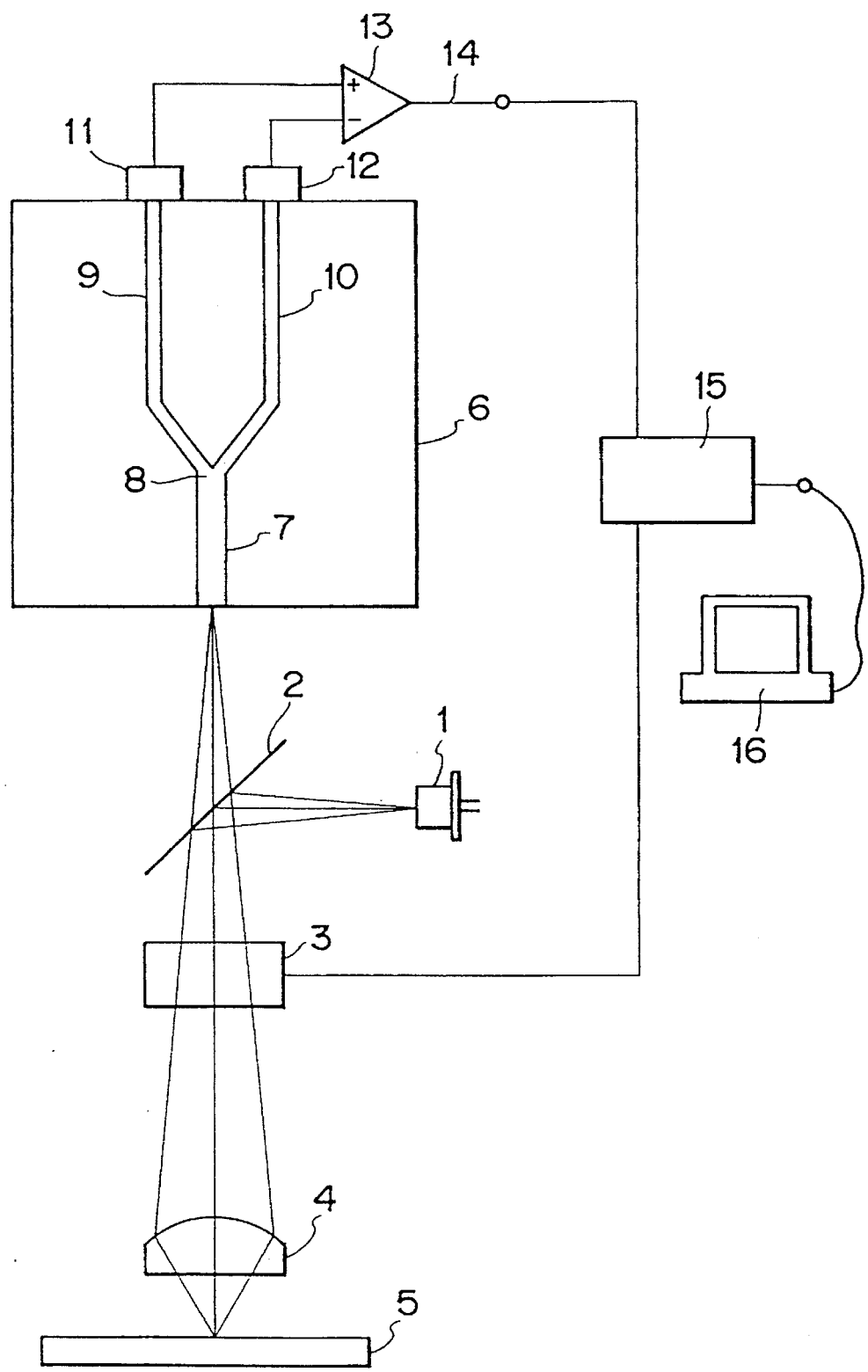
FIG. 1 schematically shows the construction of a first embodiment of the present invention.

FIG. 1 schematically shows the construction of a first embodiment of the present invention. Light emitted from a semiconductor laser source 1 is reflected by a half mirror 2, enters an objective lens 4 via well-known X–Y two-dimensional scanning means 3 and is condensed on an object surface 5. The light reflected by the object surface 5 and transmitted through the half mirror 2 again via the objective lens 4 and the X–Y two-dimensional scanning means 3 is condensed on a detecting surface on which is disposed the entrance end surface of a channel waveguide 7 formed on a substrate 6. The channel waveguide 7 is a double mode waveguide, and the light propagated through the double mode waveguide 7 soon reaches a branch-off region 8 and has its power distributed into two single mode waveguides 9 and 10, and then arrives at two photodetectors 11 and 12 joined to the substrate 6. The entrance end of the channel waveguide performs a function similar to that of a pin-hole and therefore, this construction constitutes a confocal laser scanning microscope. The half mirror 2 and the objective lens 4 together form an illuminating optical system, and the objective lens 4 forms a condensing optical system.

When as previously described, there is an inclination at a point on the object 5 illuminated by the laser spot, there is created an inclination in the phase distribution of the laser spot imaged on the entrance end of the channel waveguide 7. By this inclination, even and odd modes are excited in the double mode waveguide 7, and the ratio of light powers arriving at the two photodetectors 11 and 12 is varied by the interference between the two modes. Consequently, the differential signal 14 of the outputs of the two detectors 11 and 12 is taken by differential detecting means 13, whereby minute unevenness of the object surface can be detected. The length L of the double mode region, with the fully coupled length as Lc, can be $$L = Lc(2m+1)/2 \ (m=0, 1, 2, \ldots)$$

and this construction provides a mode interference system as already described. Specifically, by control means 15 for memorizing the differential signal 14 from the X–Y two-dimensional scanning means 3 correspondingly to the position of the light beam on the object to be examined and making it into an image, a mode interference image can be displayed on a monitor 16.

Figure 2:
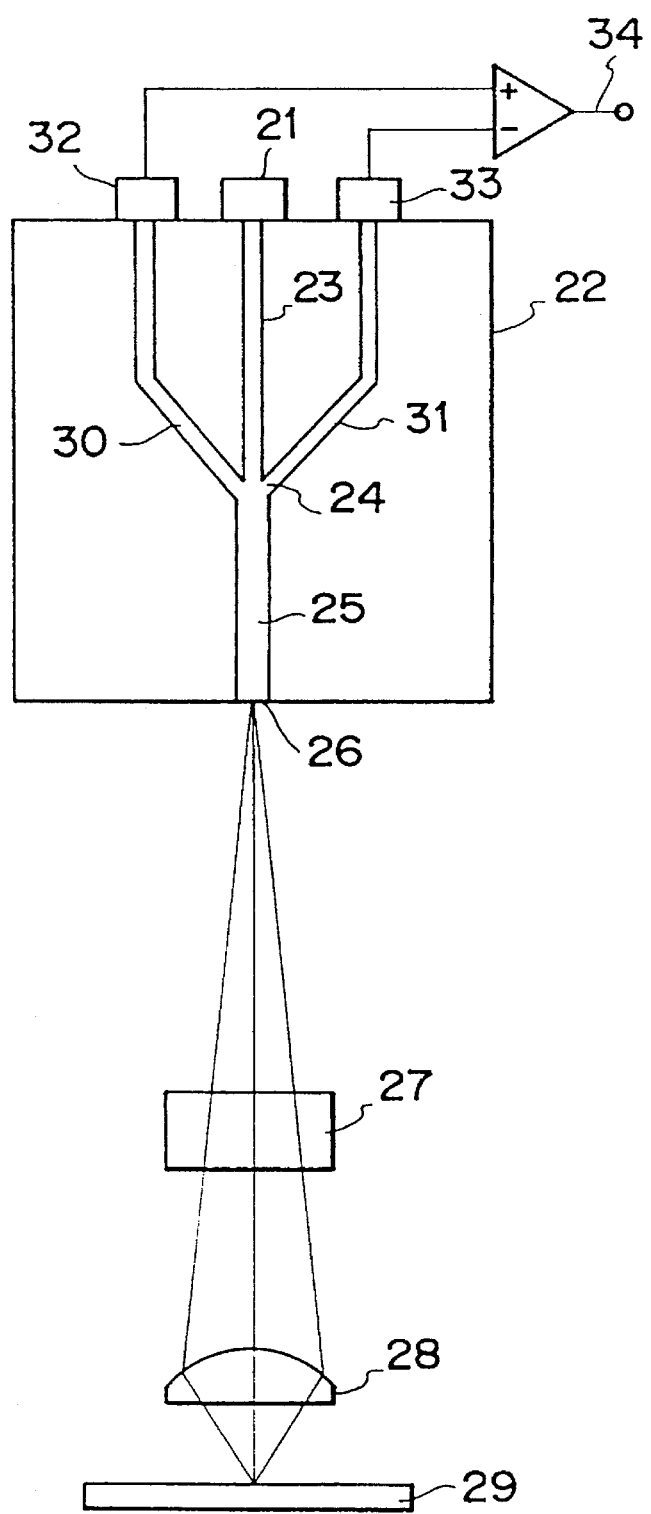
FIG. 2 schematically shows the construction of a second embodiment of the present invention.

FIG. 2 schematically shows the construction of a second embodiment of the present invention. In this construction, an objective lens 28 is used in common for an illuminating optical system and a condensing optical system, and a portion of a waveguide or detection has also the function of an illuminating system for directing a laser beam. A laser source 21 is a semiconductor laser, and is fixed to a substrate 22 so that the light coupling efficient may be greatest relative to a single mode channel waveguide 23 formed on the substrate 22. The laser beam which has entered the waveguide 23 is propagated through a double mode waveguide 25 via a fork 24. In the fork 24 of the waveguide, three single mode waveguides are coupled to the double mode waveguide 25, and the middle single mode waveguide 23 is used for illumination and the outer two single mode waveguides are used for detection which will be described later. By providing such a positional relation that the center line of the middle single mode channel waveguide 23 and the center line of the double mode waveguide 25 coincide with each other, the light entering double mode waveguide 25 from the middle single mode channel waveguide 23 excites only the even mode in the double mode waveguide 25. Accordingly the laser beam virtually emerges from an end surface 26 in a single mode state.

The illuminating light beam emerging from the end surface of the double mode waveguide 25 enters an objective lens 28 via X–Y two-dimensional scanning means 27 and is condensed on an object surface 29. The light beam reflected by the object surface 29 and thereafter passed again through the objective lens 28 and the X–Y two-dimensional scanning means 27 is condensed on a detecting surface 26 on which is disposed the end surface of the channel waveguide 25 formed on the substrate 22, and a laser spot is formed thereon. Therefore, as in the first embodiment, the power ratio distributed into two single mode channel waveguides 30 and 31 changes with the inclination of the object surface, and if the lights from the waveguides 30 and 31 are detected by photodetectors 32 and 33 fixed to the substrate 22 and the differential signal 34 thereof is taken, there will be obtained a mode interference signal. In FIG. 2, control means for making the differential signal 34 into an image by a signal from the X–Y two-dimensional scanning means 27 and a monitor are the same as those in the first embodiment shown in FIG. 1 and therefore are not shown.

Figure 3:
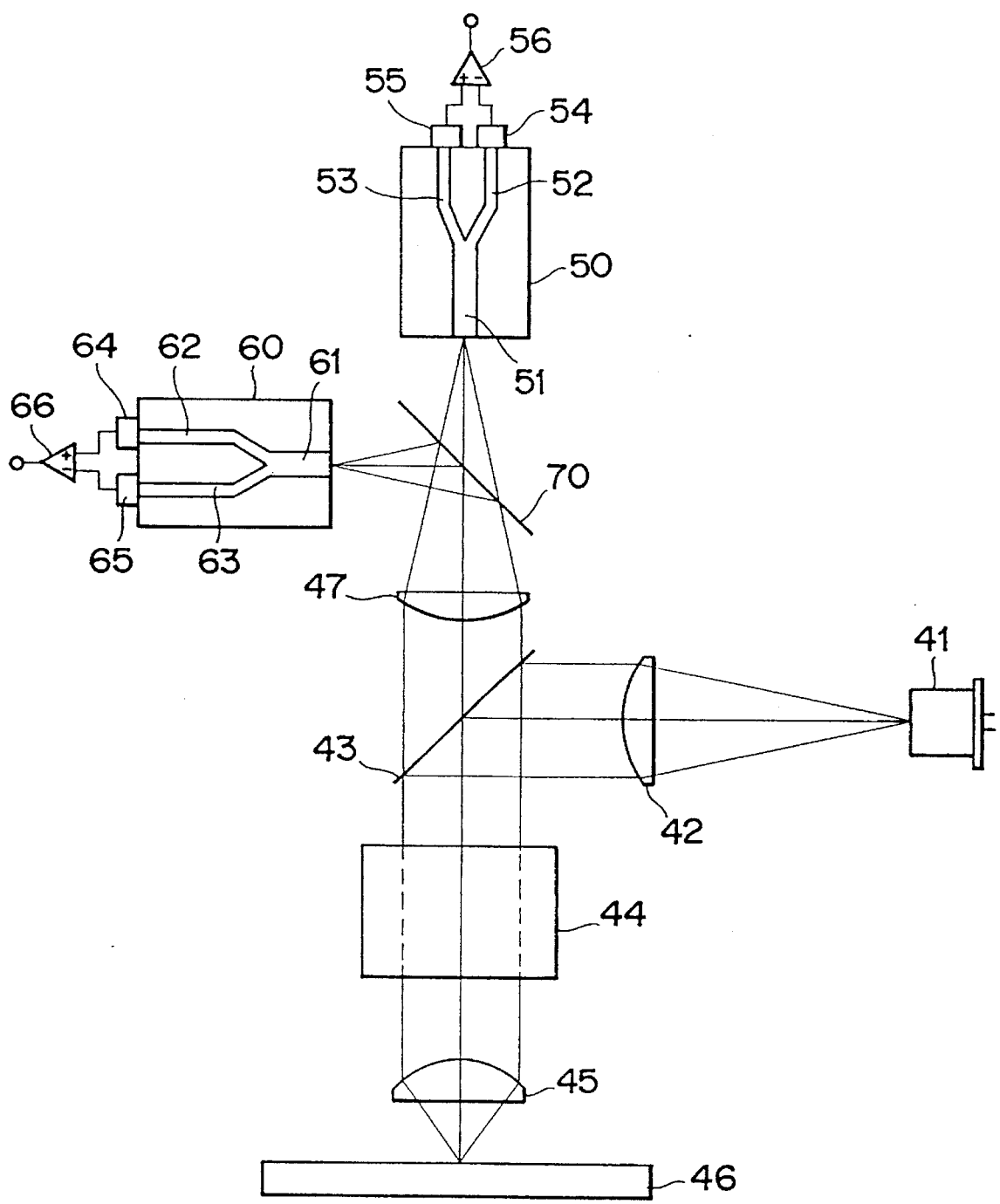
FIG. 3 schematically shows the construction of a third embodiment of the present invention.

FIG. 3 schematically shows the construction of a thin embodiment of the present invention. A light bear from a laser source 41 is converted into a parallel light beam by a collimator lens 42 and is reflected by a half mirror 43, whereafter it is condensed on an object 46 to be examined by an objective lens 45 via X–Y two-dimensional scanning means 44. The reflected light from the object 46 to be examined is subjected to the condensing action of the objective lens 45, and is transmitted through the X–Y two-dimensional scanning means 44 and the half mirror 43 and directed to detecting means. In the construction of this third embodiment, two waveguide devices 50 and 60 are used as detecting means, and a half mirror 70 for supplying the reflected light from the object to each waveguide device is disposed. Of course, the half mirror 70 may be a pivotable mirror or a removably mounted reflecting mirror. On the respective waveguide devices, as on the waveguide device formed on the substrate 6 in the first embodiment shown in FIG. 1, there are provided double mode waveguides 51, 61 and two single mode waveguides 52, 53 and 62, 63 branching off subsequently thereto, and photodetectors 54, 55 and 64, 65 are joined to the exit ends of the respective single mode waveguides. As in the construction of FIG. 1, there are provided differential detecting means 56 and 66 for obtaining the differential signal of the signals from the respective photodetectors.

What is important here is the lengths $L_1$ and $L_2$ of the double mode waveguide regions 51 and 61, respectively, in the first waveguide device 50 and the second waveguide device 60. If the fully coupled length of the even mode and the odd mode is Lc, $L_1$ and $L_2$ are preferably chosen to be $L_1=mLc$ (m=1, 2, . . . )

$L_2=Lc(2m+1)/2$ (m=0, 1, 2, . . . )

A phase difference integer times as great as 180° is then brought about between the even mode and the odd mode from the output of the first waveguide device 50 and the before, the differential image of the intensity distribution of the object can be taken out. Also, a phase difference odd number times as great as 90° is brought about between the two modes from the of output of the second waveguide device 60, and the differential image of the phase distribution of the object can be taken out. Again in the construction of FIG. 3, the control means and the monitor are the same as those in the first embodiment shown in FIG. 1 and therefore are not shown.

Figure 4:
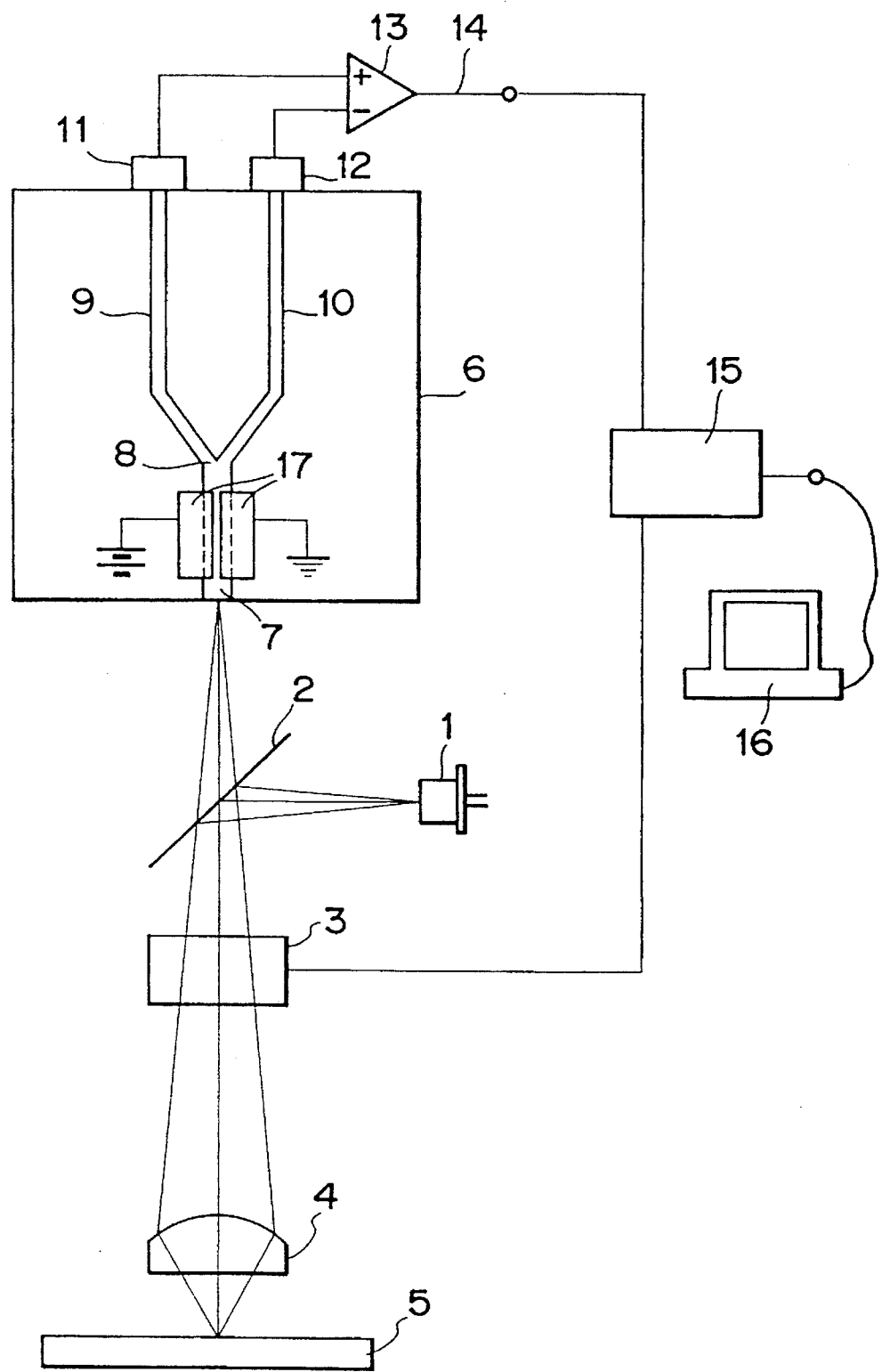
FIG. 4 schematically shows the construction of a fourth embodiment using a substrate on which electrodes are provided.

A fourth embodiment shown in FIG. 4 is such that in the construction of the first embodiment shown in FIG. 1, the substrate has an electro-optical effect and electrodes 17 are provided in the double mode channel waveguide region. By changing in the voltage applied to electrodes 17, it becomes possible to arbitrarily change the fully coupled length in the double mode channel waveguide, and by satisfying any one relation shown in expression (11) above, it becomes possible to obtain the amplitude information and phase information of the object independently of each other.

Figure 5:
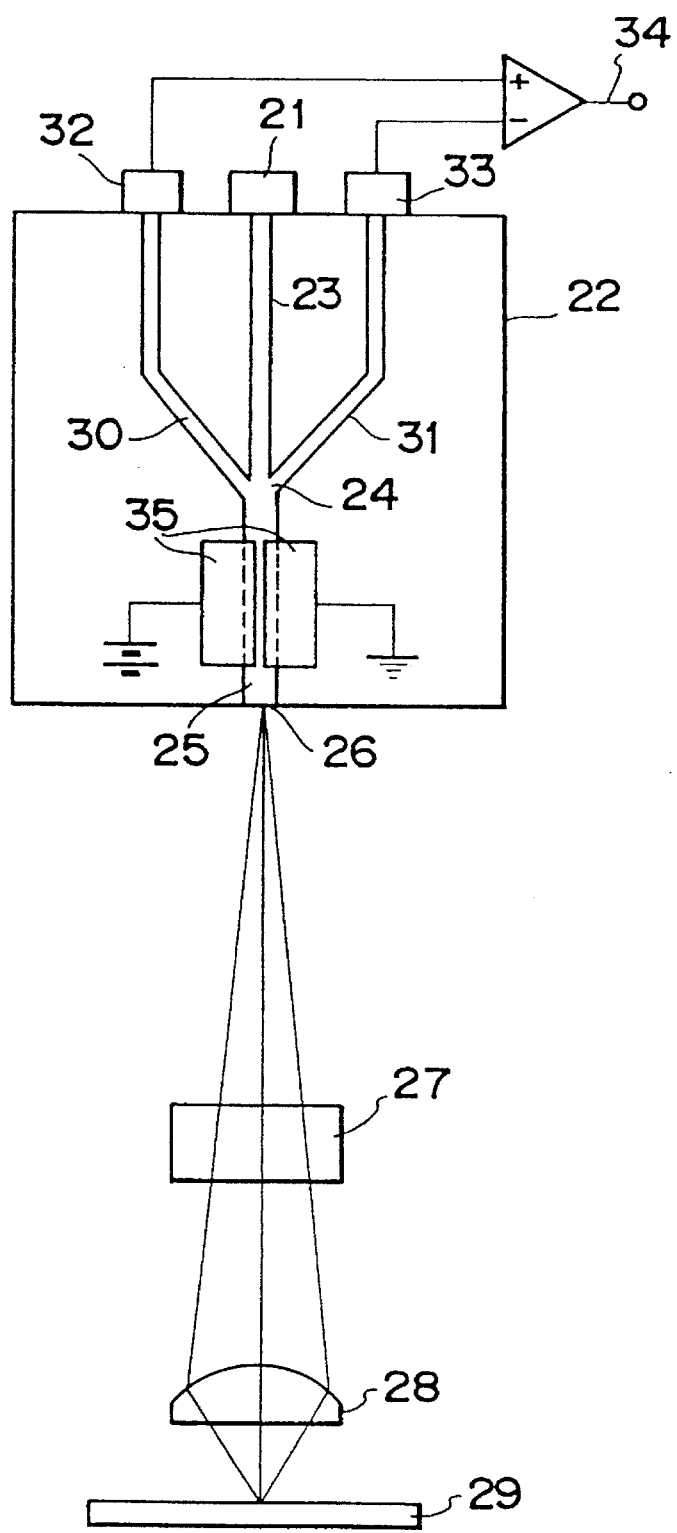
FIG. 5 schematically shows the construction of a fifth embodiment using a substrate on which electrodes are provided.

The construction of a fifth embodiment shown in FIG. 5 is such that in the construction of the second embodiment shown in FIG. 2, the substrate likewise has an electro-optical effect and electrodes 35 are provided in the double mode channel waveguide region. Again in this construction, by changing the voltage applied to the electrodes 35, it becomes possible to obtain the amplitude information and phase information of the object independently of each other.

In the fourth and fifth embodiments described above, each two electrodes 17 and 35 for applying a voltage the double mode waveguides 7 and 25, respectively, are arranged symmetrically with respect to the corresponding waveguides 7 and 25, but depending on the state of the substrate used (in the case of a crystal substrate, the direction or the like of the crystal axis), the electrode arrangement as shown in FIGS. 4 and 5 is not always optimal.

Figure 6:
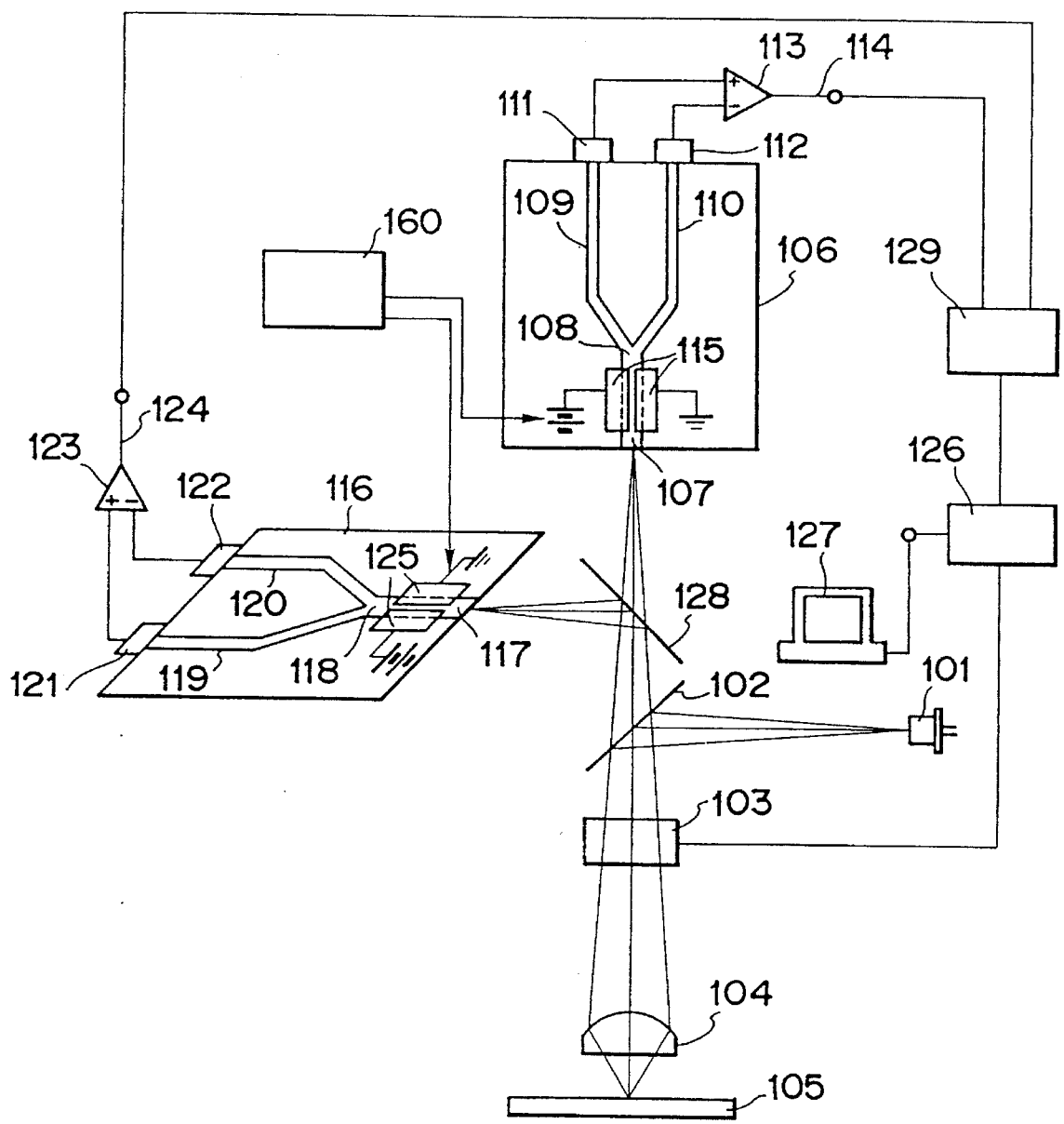
FIG. 6 schematically shows the construction of a sixth embodiment in which two detecting means are combined.

FIG. 6 schematically shows the construction of a sixth embodiment of the present invention. In this embodiment, by combining two detecting means, it is made possible to detect the differential information of the object to be examined in any direction.

As shown in FIG. 6, light emitted from a semiconductor laser source 101 is reflected by a half mirror 102, enters an objective lens 104 via well-known X–Y two-dimensional scanning means 103 and is condensed on an object surface 105. The light reflected by the object surface 105 and thereafter again passed through the objective lens 104 and th X–Y two-dimensional scanning means 103 and transmitted through the half mirror 102 is caused to branch off to two optical paths by a second half mirror 128. The light transmitted through the second half mirror 128 is condensed on the entrance end surface of a channel waveguide 107 formed on first substrate 106 which constitutes first detecting means. Also, the light reflected by the second half mirror 128 is condensed on the entrance end surface of a channel waveguide 117 formed on a second substrate 116 which constitutes second detecting means. The first substrate 106 and the second substrate 116 are equivalent substrates both having an electro-optical effect. The channel waveguide 107 formed on the first substrate 106 is a double mode waveguide comprising electrodes 115 disposed or a substrate, and the light propagated through the double mode waveguide 107 soon arrives at a branch-off region 108 and its power is distributed into two single mode waveguides 109 and 110, and the light passes to two photodetectors 111 and 112 joined to the substrate 106.

Likewise, the channel waveguide 117 formed on the second substrate 116 is a double mode waveguide comprising electrodes 125 disposed on a substrate, and the light propagated through the double mode waveguide 117 arrives at a branch-off region 118 and its power distributed into two single mode waveguides 119 and 120, and the light arrives at two photoderectors 121 and 122 joined to the substrate 116. Since the entrance ends of the channel waveguides 107 and 117 perform a function similar to that of a pin-hole, this construction constitutes a confocal laser scanning microscope. The half mirror 102 for illumination and the objective lens 104 together form an illuminating optical system, and the objective lens 104 forms a condensing optical system.

When as previously described, there is an inclination or a gradient of reflectance at a point on the object 105 illuminated by the laser spot, an inclination is created in the phase distribution or intensity distribution of the laser spot imaged on the entrance ends of the channel waveguides 107 and 117, and the direction thereof corresponds to the widthwise direction of each double mode region. By the inclination in the widthwise direction of each double mode region, even and odd modes are excited the double mode waveguides 107 and 117, respectively, and the ratio of the light powers arriving at the two pairs of photodetectors 111, 112 and 121, 122 is varied by the interference between the two modes. Consequently, by taking the differential signals 114 and 124 of the outputs of the pairs of detectors 111, 112 and 121, 122 by differential detecting means 113 and 123, a minute level difference or a variation in reflectance on the object surface can be detected with respect to each direction.

The length L of the double mode region, with the fully coupled length as Lc, when the phase distribution of the object is observed, can be $L=Lc(2m+1)/2$, (m=0, 1, 2, . . . )

and when the intensity distribution of the object is observed, can be $L=mLc$, (m=1, 2 . . . . )

and this construction provides a mode interference system, as described above.

The substrates 106 and 116 both have an electro-optical effect and therefore, if the voltage applied to the electrodes 115 and 125 is varied, the fully coupled length Lc can be varied. Consequently, the above two conditions are established relative to the length L of the same double mode region by adjusting the voltage applied to the electrodes 115 in the first substrate 106. That is, the phase distribution and the intensity distribution of the object can be detected independently of each other by one waveguide device. A similar action becomes possible by adjusting the voltage applied to the electrodes 125 in the second substrate 116, but since the widthwise direction of the double mode region 117 is perpendicular to that of the first substrate 106, the direction in which there is treated the contrast of the obtained signals of the phase distribution and intensity distribution is orthogonal to the direction in which a contrast is created by the signals obtained in the substrate 106. As described above, by signal-processing the differential signals 114 and 124 obtained by the two substrates 106 and 116, there can be obtained a mode interference image having a contrast in a desired direction.

Specifically, when the differential signals 114 and 124 are said $I_1$ and $I_2$, respectively, signal processing means 129 processes so that the combined signal I of the two may be given by equation (12) above. Control means 126 can memorize the output from the signal processing means 129 correspondingly to the position of the light beam on the object to be examined from the X–Y two-dimensional scanning means 103 and convert this output into image information, and display a desired mode interference image on a monitor 127. Here, for the signal processing means 129, θ can be arbitrarily varied within the range of $0 - \pi$, and by suitably varying this θ, the direction in which the contrast of the differential image is created can be arbitrarily changed.

Figure 7:
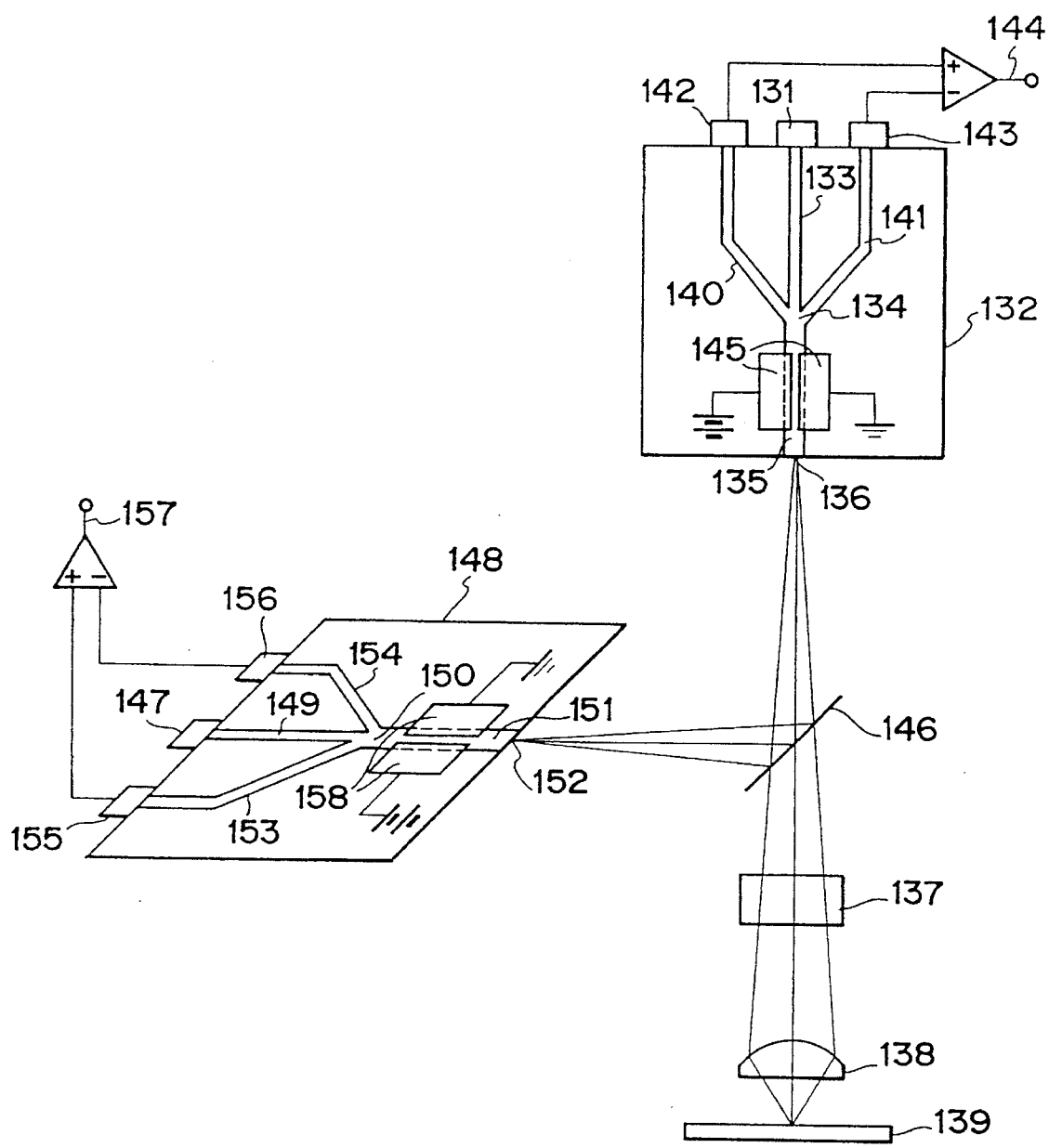
FIG. 7 schematically shows the construction of a seventh embodiment in which two detecting means are combined.

FIG. 7 schematically shows the construction of a seventh embodiment of the present invention. This construction, like that shown in FIG. 6, is a construction of the coaxial fall type in which an objective lens 138 is used in common for an illuminating optical system and a condensing optical system, but a portion of a waveguide in two detecting means has also the function of an illuminating system for directing a laser beam. With regard to a first substrate 132 which constitutes first detecting means, a laser source 131 is a semiconductor laser and is fixed to the substrate 132 so that the light coupling efficiency may be greatest for a single mode channel waveguide 133 formed on the substrate 132 having an electro-optical effect. The laser beam which has entered the waveguide 133 is propagated via a fork 134 through a double mode waveguide 135 comprising electrodes 145 disposed on the surface of substrate. In the fork 34 of the waveguide, three single mode waveguides are coupled to a double mode waveguide 135, and the middle single mode waveguide 133 is used for illumination and the outer two single mode waveguides 140 and 141 are used for detection which will be described later.

By providing such a positional relation that the center line of the middle single mode channel waveguide 133 and the center line of the double mode waveguide 135 coincide with each other, the light entering the double mode waveguide 135 from the single mode channel waveguide 133 excites only the even mode in the double mode waveguide 135. Accordingly, the laser beam virtually emerges from an end surface 136 in a single mode state.

A second substrate 148 which constitutes second detecting means is constructed similarly to the substrate 132, and a laser beam from a semiconductor laser 147 is propagated through a single mode waveguide 149 via a fork 150 and through a double mode waveguide 151, and emerges from an end surface 152 in a single mode state.

The illuminating light beam emerging from the end surfaces of the double mode waveguides 135 and 151 passes through a half mirror 146 to an objective lens 138 via X–Y two-dimensional scanning means 137, and is condensed on an object surface 139. The light beam reflected by the object surface 139 and thereafter again passed through the objective lens 138 and the X–Y two-dimensional scanning means 137 passes through a half mirror 146 and a part of this light beam arrives at the first substrate 132 of the first detecting means and the remainder arrives at the second substrate 148 of the second detecting means. The light beam is condensed on the end surfaces (detecting surfaces) of the double mode waveguides 135 and 151 formed on the respective substrates, and laser spots are formed thereon. Thereafter, as in the first embodiment, the ratio of powers distributed into the outer two single mode channel waveguides 140, 141 and 153, 154 of the three single mode waveguides in the respective substrates changes with the inclination of the object surface, and if the lights from the waveguides 140, 141 and 153, 154 are detected by photodetectors 142, 143 and 155, 156 fixed to the substrates 132 and 148, respectively, and differential signals 144 and 157 are taken, there are obtained mode interference signals by the respective detecting means.

Again in this construction, the substrates 132 and 148 each have an electro-optical effect and therefore, if the voltage applied to the electrodes 145 and 158 is varied, the fully coupled length Lc can be varied and the phase distribution and intensity distribution of the object can be detected independently of each other by one waveguide device. Likewise, the widthwise direction of the double mode waveguide 135 in the first substrate 132 is perpendicular to the widthwise direction of the double mode waveguide 151 in the second substrate 148 and therefore, the directions in which there are created the contrasts of the obtained signals of the phase distribution and intensity distribution are also orthogonal to each other. This by signal-processing differential signals 144 and 157, there is obtained a mode interference image having a contrast in a desired direction.

In FIG. 7, signal processing means for the differential signals 144 and 157, control means for making the differential signals into an image by a signal from the X–Y two-dimensional scanning means and a monitor are the same as those in the sixth embodiment shown in FIG. 6 and therefore are not shown.

In the construction shown in FIG. 7, illuminating lights are supplied from the laser sources 131 and 147 in both of the two substrates 132 and 148, but since an illuminating light can be supplied from only one of the two laser sources, the other laser source is not always necessary. In such case, it will become possible to replace one of the substrates 132 and 148 of the two detecting means shown in FIG. 7 with the substrate 106 or 116 shown in FIG. 6. Where laser sources are provided on both substrates, if a laser beam is supplied from only one of the laser sources and switching is made to the other laser source when one laser source malfunctions, it will become possible to continue the operation of the microscope without replacing the malfunctioning laser source.

Also, in the sixth and seventh embodiments described above, there is adopted a construction in which the differential signals from the two detecting means are combined and image-processed, but it is also possible to design such that by displaying the differential signals from the two detecting means on discrete monitors, the differential images of the object in a certain direction and a direction orthogonal thereto are observed discretely from each other.

A minute step height measuring apparatus of the present invention is structured to have a confocal laser scanning mode interference contrast microscope and memory means and calculating means both annexed to the microscope. The memory means has a constant of the apparatus. The calculating means is for obtaining the step height of an object by the apparatus constant and difference and sum signal outputs from the microscope. Separate apparatuses for the respective memory and calculating means may be combined to be a single step height measuring machine but practically it is preferable to make one computer have both functions.

Figure 9:
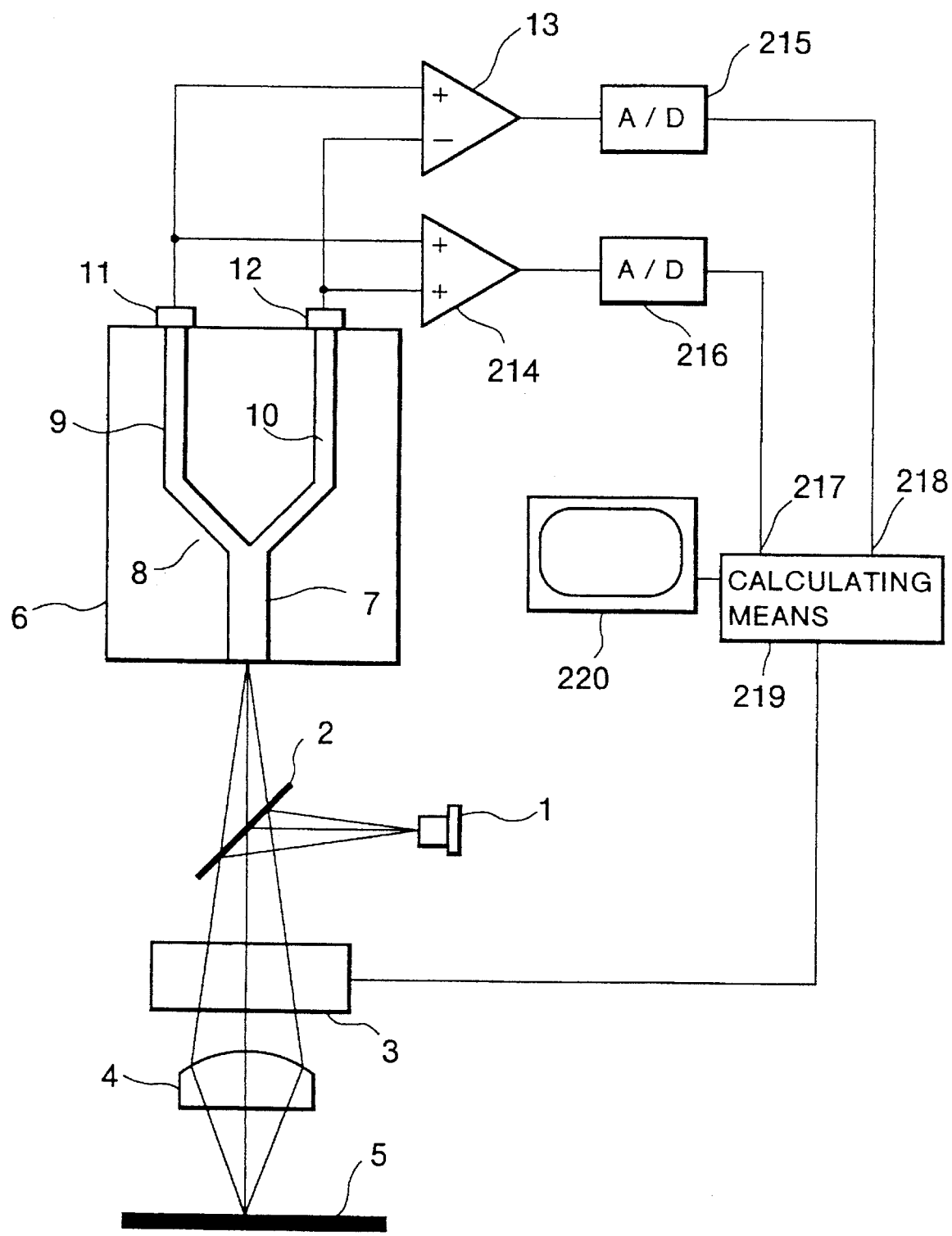
FIG. 9 schematically shows the construction of an eighth embodiment of the present invention.

FIG. 9 is a schematic diagram showing a step height measuring apparatus of an embodiment of the present invention. Light emitted from a laser source 1 is reflected by a half mirror 2 and focused on the surface of an object 5 via X–Y two-dimensional scanning means an objective lens 4. The light reflected by the surface of the object and transmitted again through the objective lens 4, the X–Y two-dimensional scanning means 3 and the half mirror 2 is incident on the entrance end surface of a double mode channel waveguide formed on the substrate 6. The length of the double mode channel waveguide 7 is chosen to be optimum for observing phase objects, so that the light propagated through the double mode channel waveguide 7 is distributed at a branch-off region 8 into two channel waveguides 9 and 10 in the optimum distribution ratio for reflecting the step heights on the surface of the object 5 strongly.

The respective lights propagated through the channel waveguides 9 and 10 are subjected to the intensity measurement by photodetectors 11 and 12 provided at the exit ends of the channel waveguides 9 and 10. Signals output from the photodetectors 11 and 12 are simultaneously supplied to a subtracting circuit 13 and an adding circuit 214. The signals output from the subtracting and adding circuits 13 and 214 are respectively sent to A/D converters 215 and 216 to be quantized. The quantized difference and sum signals are input in calculating means 219 from respective input ports 217 and 218. The calculating means 219 stores in an internal memory unit an apparatus constant which was preliminarily and experimentally obtained for the minute step height measuring machine in this embodiment.

The calculating means 219 calculates a step height $\phi$ on the surface of the object 5 within the laser light spot from the apparatus constant and the quantized difference and sum signals based on the equation (122). The result of the calculation is displayed on a monitor 220 as across section of the object 5 together with a scale indicating the absolute value of the step height based on tie positional information of the laser light spot on surface of the object from the X–Y two-dimensional scanning means 3.

The apparatus constant in this embodiment was determined as follows. First, a standard sample was formed on Si substrate by means of a reactive dry etching technique. A step height of the standard sample was measured by an interferometer. The sample was measured by the step height measuring machine of invention to obtain difference and sum signals. An apparatus constant $C_p$ was calculated from these difference and sum signals by using the equation (122). A plurality of standard samples having various step heights were preferably formed to reduce the error and apparatus constants obtained from the respective standard samples were averaged to determine the apparatus constant for the step height measuring machine in this embodiment.

Figure 10:
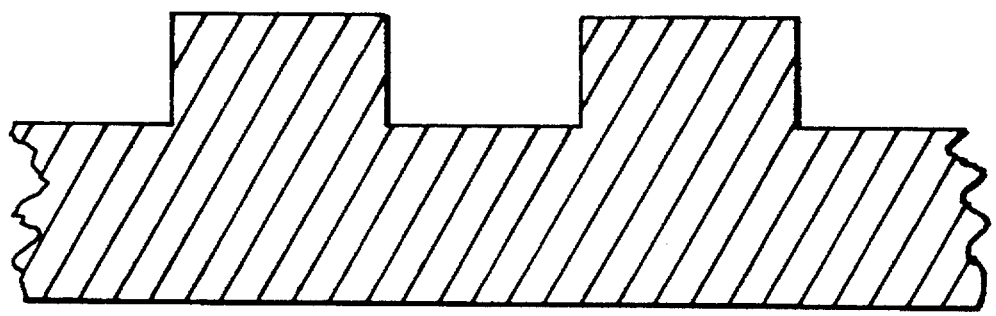
FIG. 10 is a sectional view of a standard sample to be used in the eighth embodiment.
Figure 11A:
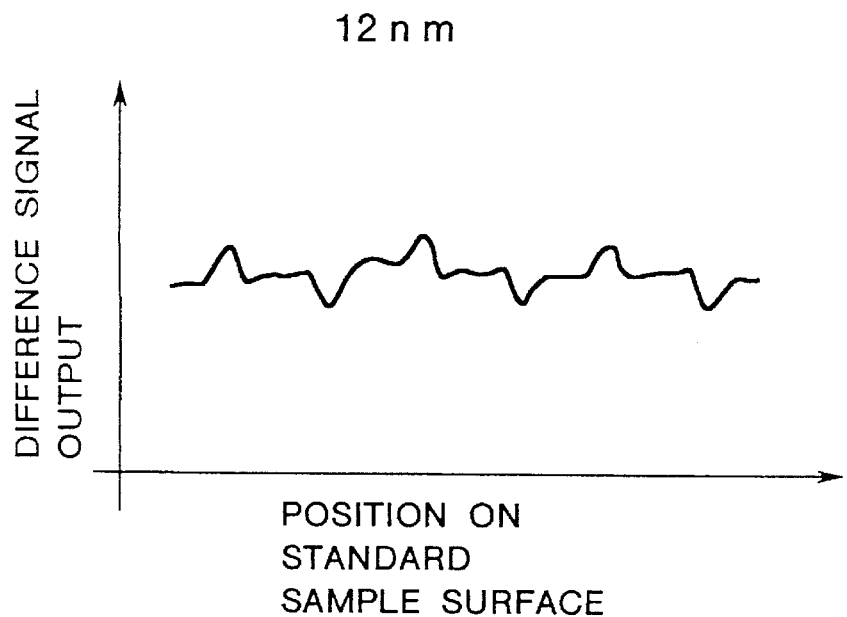
FIGS. 11A and 11B show examples of difference signal outputs in the eighth embodiment.
Figure 11B:
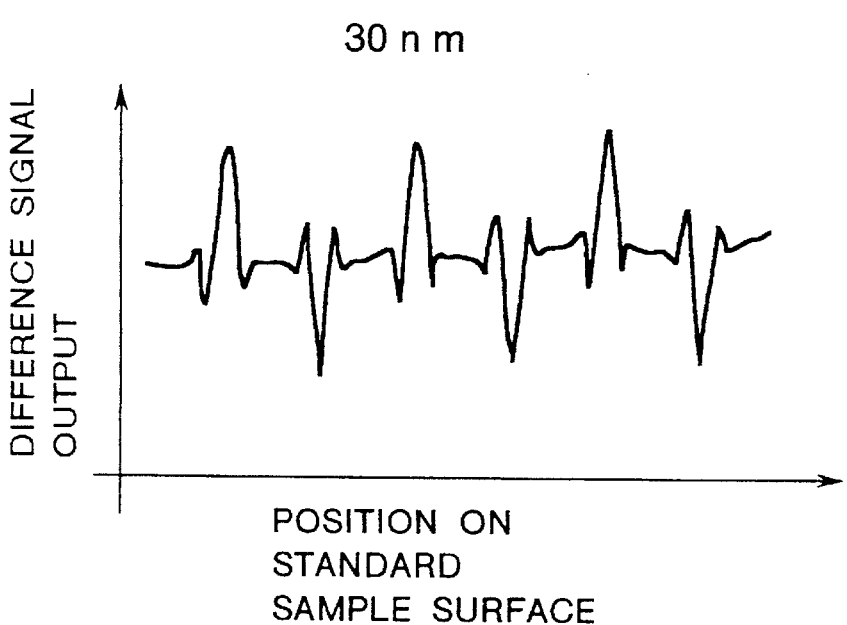

FIG. 10 is a sectional view of a standard sample. FIGS. 11A and 11B show portions of difference signal outputs obtained from standard samples with step heights of 12 nm and step heights of 30 nm respectively relative to the surfaces of the respective standard samples. Thus, the difference signal outputs are varied in with the largeness of the step heights. If not the absolute values of the step heights but only the relative configuration of the step heights is required, the procedure of obtaining the apparatus is omitted. Although the apparatus constant $C_p$ is determined prior to the measurement in this embodiment, only the relative configuration of the step heights may be obtained at the time of the measurement and stored in an external memory unit and thereafter, the absolute configuration of the step heights may be obtained by calculation with the obtained apparatus constant.

In the minute step height apparatus of FIG. 9, as described above, the length L of the double mode channel waveguide needs to satisfy $$L=Lc(2m+1)/2 \ (m=0, 1, 2, \ldots )$$

to make the apparatus detect the phase information of the object.

However, when the substrate has the electro-optical effect and electrodes are provided in the double mode channel waveguide region as in FIGS. 4 and 5, the above condition can be satisfied by applying a voltage to the electrodes while the length L of the double mode channel waveguide is kept constant. That is because the fully coupled length Lc can be varied by applying the voltage to the double mode channel waveguide region, as disclosed above.

Figure 12:
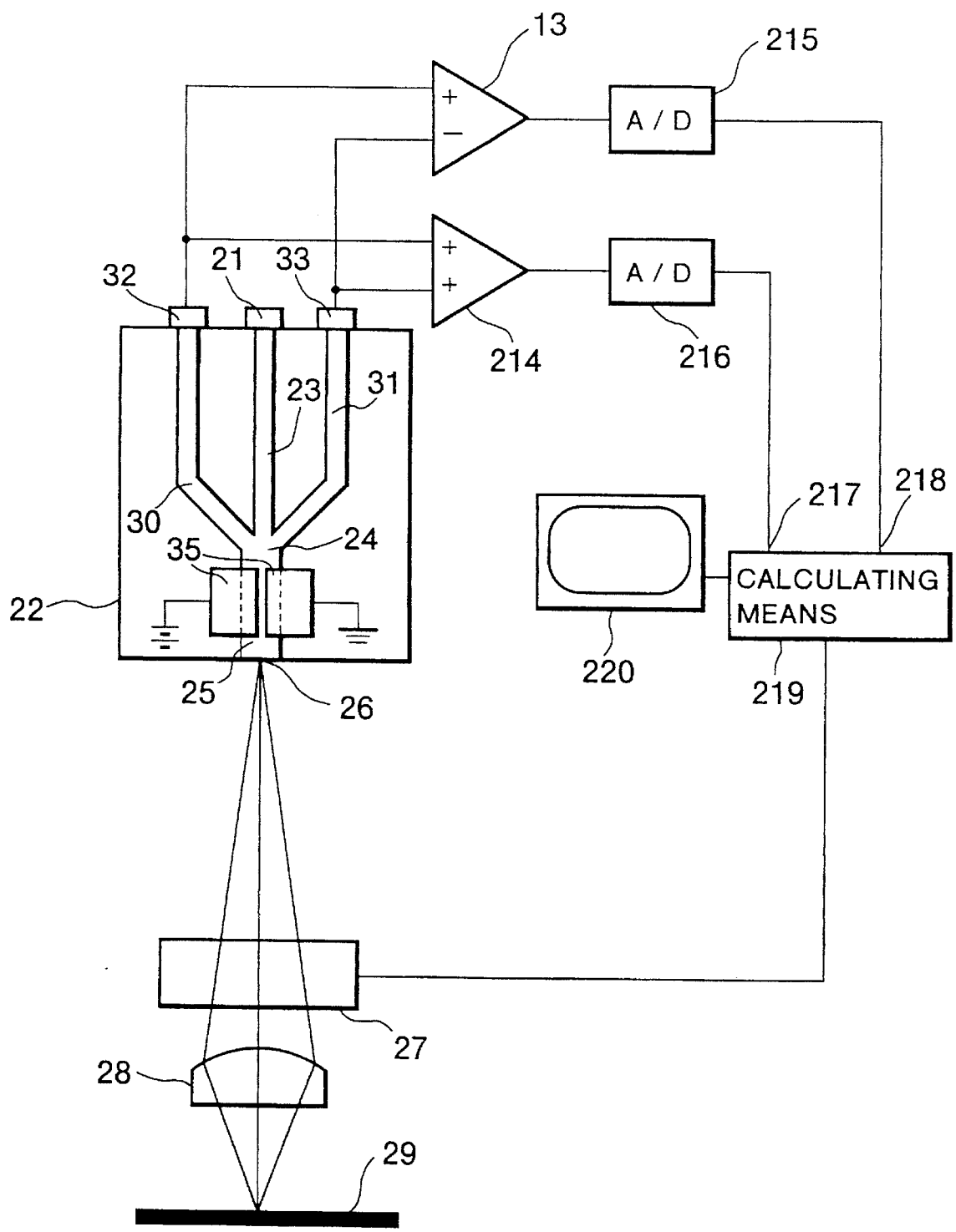
FIG. 12 schematically shows the construction of a ninth embodiment of the present invention.

The minute step height measuring apparatus of FIG. 12 utilizes the confocal laser scanning mode interference contrast microscope of the fifth embodiment as shown in FIG. 5. Elements identical to those in the fifth embodiment are designated by the identical reference numerals.

The double mode channel waveguide 25 of the substrate 22 is provided with the electrodes 35 to which the voltage is applied to vary the fully coupled length Lc in the double mode channel waveguide 5. Similarly to the structure of FIG. 2, the three channel waveguides are branched from the double mode channel waveguide 25 and the light from the semiconductor laser 21 is supplied through the middle channel waveguide 23. The light reflected by the object surface and propagated through the double mode channel waveguide is distributed into the outer two channel waveguides 30 and 31 in accordance with the phase information of the object. Then, the minute step height of the object 29 is calculated from the signals of the photodetectors 32 and 33 by the subtracting and adding circuits 13 and 214 and the calculating means 219 and thereafter displayed on the monitor 220. Strictly speaking, the zeroth-order mode light in the double mode channel waveguide is introduced not only into the outer two channel waveguides 30 and 31 but also into the middle waveguide 23. This results in the change of the effective value of $\eta_0$. However, this change does not require any measuring procedure provided the constant $C_A$ in equation (122) is obtained by using the standard sample mentioned above.

In the structures of FIGS. 9 and 12, the measurement of the step heights is possible only in on axial direction of the X–Y plane on the surface of the object. However, when the present invention is applied to the confocal laser scanning mode interference contrast microscopes of FIGS. 6 and 7 wherein a differential image can be obtained in two axial directions the configuration of the surface of the object can be reproduced completely.

According to the present invention, it is possible to measure the step heights of the surface of the object without damaging the object and without being in contact with the object. Also, there is no need to provide a plurality of detecting devices and the apparatus can be provided with only one detecting device consisting of a substrate with a channel waveguide, making it possible to form the apparatus at low cost. Further, its quantification is supported by the wave optical image formation theory, so that it is possible to quantifiably measure the minute step heights on the object with high resolution and with ease even though the width of the minute step heights is smaller than that of the laser light spot.

Description will now be made of improved light information detecting devices according to the present invention.

Figure 13:
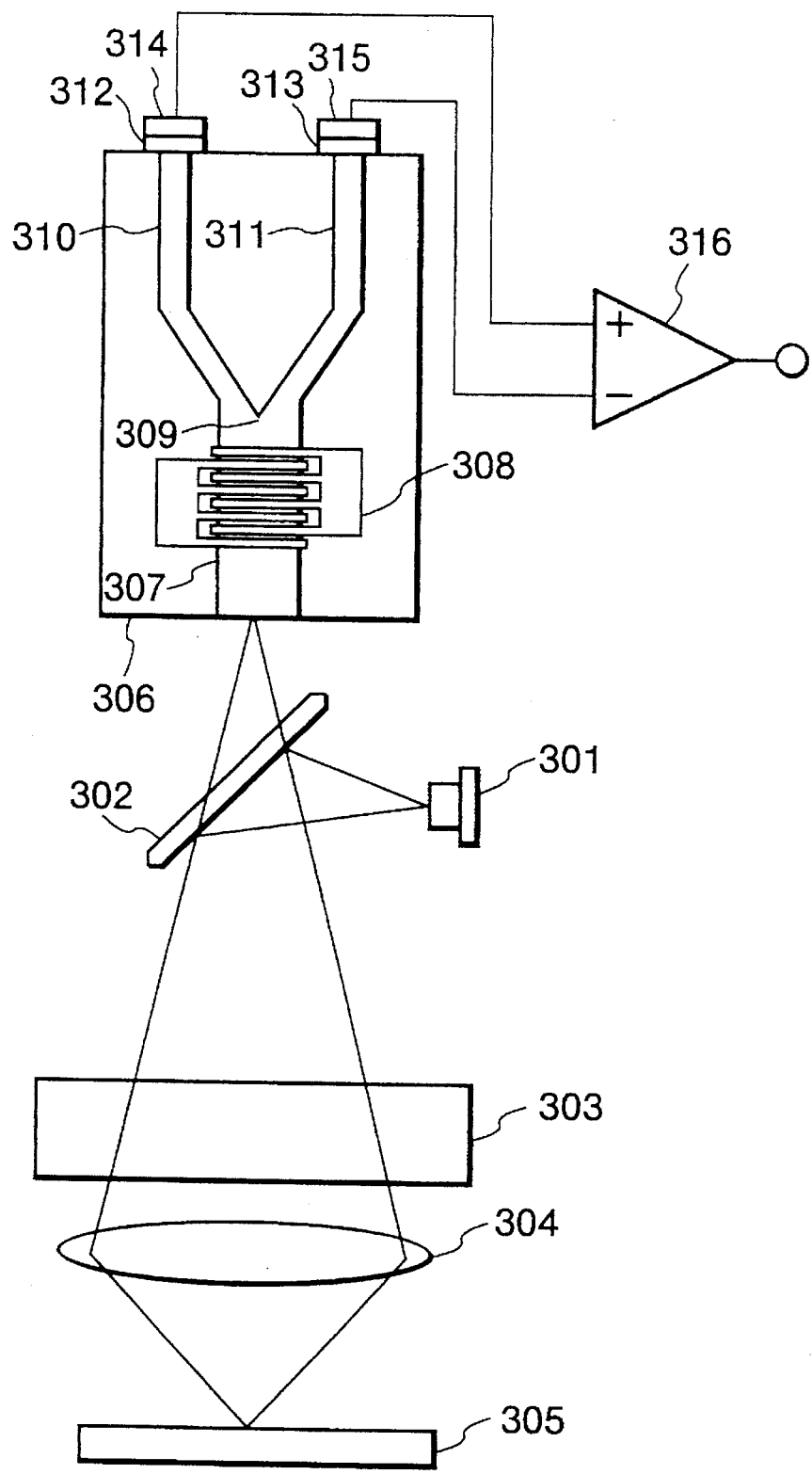
FIG. 13 is a schematic diagram showing a confocal laser scanning mode interference contrast microscope which uses a light information detecting device according to a tenth embodiment of the present invention.

FIG. 13 is a schematic diagram showing a confocal laser scanning mode interference contrast microscope which uses a light information detecting device according to a tenth embodiment of the present invention.

In the confocal laser scanning mode interference contrast microscope, light emitted from a linearly polarized laser light source 301 is reflected by a half mirror 302, and is focused on the surface of an object 305 to be detected via an X-Y scanning means 303 and a lens 304. The light reflected by the surface of the object 305 to be detected is transmitted through the lens 304, the X-Y scanning means 303, and the half mirror 302 again, and is incident on the incident end face of a double mode channel waveguide 307. The double mode channel waveguide 307 and light-distribution single mode channel waveguides 310 and 311 are formed by thermally diffusing titanium on a lithium niobate substrate 306. The light incident on the double mode channel waveguide 307 excites zeroth-and first-order mode light components in correspondence with a step or a change in reflectance in the spot focused on the object 305 to be detected. The laser light source 301 is arrange so that light to be excited in the substrate is TE mode light.

The substrate 306 used in the present embodiment is an X-cut Y-propagation lithium niobate substrate, and has an optical anisotropy and an electro-optic effect. Therefore, when a voltage is applied to an interdigital electrode 308, which is arranged on the double mode channel waveguide 307 via a silicon oxide buffer layer and has a periodic structure, and an electric field is applied to the double mode channel waveguide 307, the interdigital electrode 308 (an electrode having a periodic structure) serves as a TE/TM mode converter. The shape of the interdigital electrode 308 (an electrode having a periodic structure) is designed to selectively TE/TM mode-convert only the zeroth-order mode light which propagates in the double mode channel waveguide 307. In the tenth embodiment, since the wavelength of light emitted from the laser light source 1 was 632.8 nm and the effective refractive indices of TE and TM mode light components were respectively set to be NTE= 2.20670 and NTM=2.29663, the period Λ of the interdigital electrode 308 (an electrode having a periodic structure) was set to be 7.04 μm.

The zeroth-order mode light which is TE/TM mode-converted from the TE mode to the TM mode by the interdigital electrode 308 and the first-order mode light which is not TE/TM mode-converted are split into the two light-distribution channel waveguides 310 and 311 by a branch-off region 309. Photodetectors 314 and 315 are attached to the exit edges of the two light-distribution single mode channel waveguides 310 and 311 via polarization plates 312 and 313, which selectively transmit TE mode light therethrough. For this reason, the zeroth-order mode light converted to the TM mode is blocked so as not to reach the photodetectors 314 and 315. As a result, the output from a subtraction circuit 316 exhibits a high S/N ratio since an offset component is suppressed.

Note that the tenth embodiment adopts the Y-propagation lithium niobate substrate. When an X-propagation lithium niobate substrate is used, the same effect as described above can be expected by a periodic structure electrode. A TE/TM mode converter using a Z-propagation lithium niobate substrate is proposed in, e.g., M. Haruna, J. Shinoda and H. Nishihara, "An efficient TE-TM mode converter using a z-propagation LiNbO₃ waveguide", Trans. IEEE, E69, 4 (1986) 418. Since TE and TM modes almost degenerate in the Z-propagation substrate, a TE/TM mode converter formed on the Z-propagating substrate does not use a periodic structure electrode used in the X- and Y-propagation substrates. For this reason, such a TE/TM mode converter has a feature of allowing an operation in a relatively wide wavelength range. However, when this TE/TM mode converter is applied to the present invention, it is difficult to TE/TM mode-convert only one of the zeroth- and first-order modes. Therefore, the X- or Y-propagation substrate is preferably used as the substrate.

In the tenth embodiment, TE/TM mode conversion is performed for the zeroth-order mode light. Conversely, TE/TM mode conversion may be performed for the first-order mode light. However, in this case, after the zeroth-order mode light is suppressed, the directions of polarization of the zeroth- and first-order mode light components must be matched with each other again.

Figure 14:
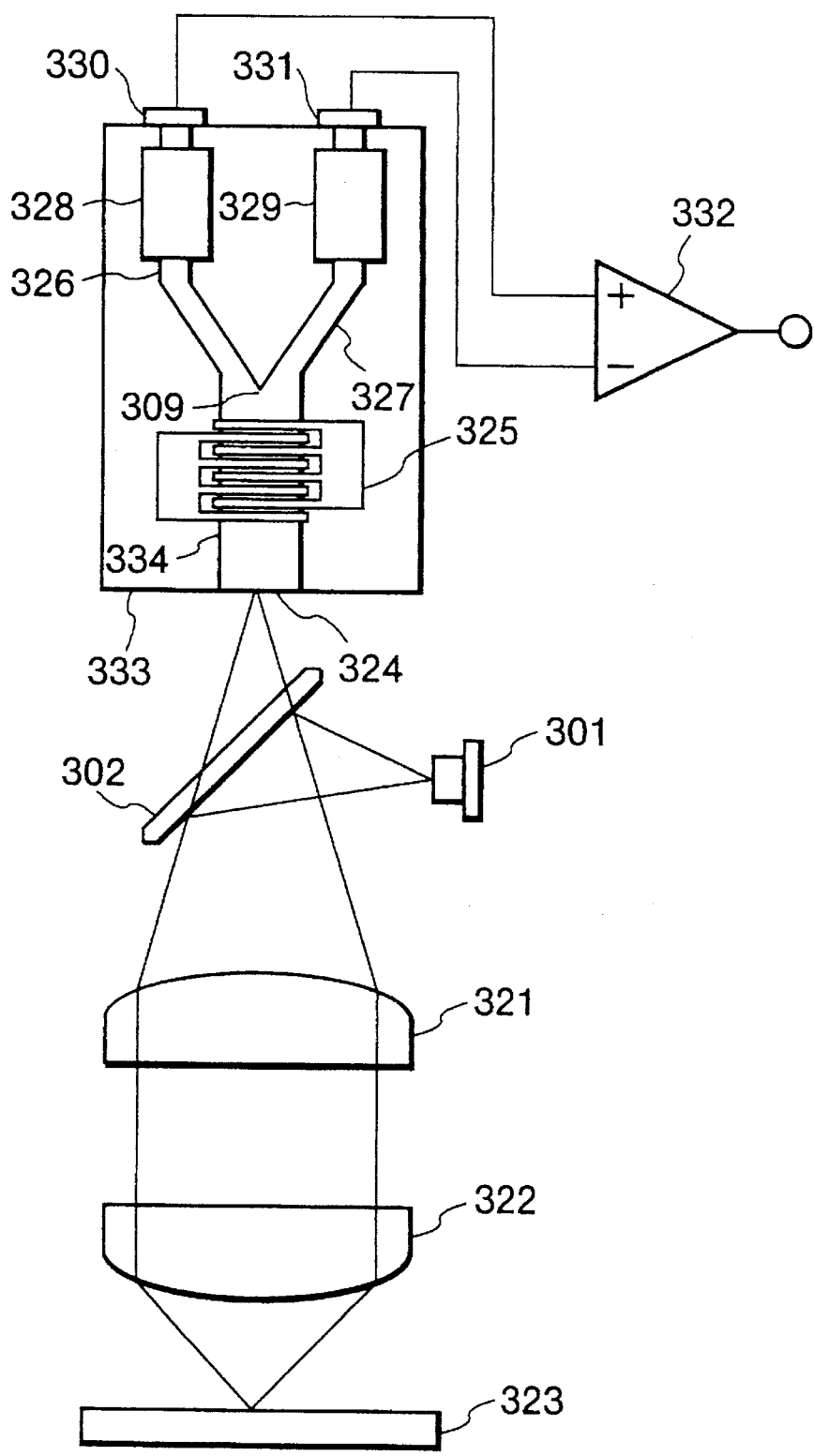
FIG. 14 is a schematic diagram showing an optical pickup apparatus which uses a light information detecting device according to an eleventh embodiment of the present invention.

FIG. 14 is a schematic diagram showing an optical pickup apparatus which uses a light information detecting device according to an eleventh embodiment of the present invention. The optical pickup apparatus is disclosed in detail in Japanese Laid-Open Patent Application No. 4-252444. Note that the same reference numerals in this embodiment denote the same parts as in the first embodiment, and a detailed description thereof will be omitted.

Although the arrangement of the eleventh embodiment is substantially the same as that of the tenth embodiment, an object to be detected in the eleventh embodiment is an optical disk 323, and a double mode channel waveguide 334 is manufactured to have a length which satisfies equation (7). In the eleventh embodiment, a laser beam emitted from a laser light source 301 is reflected by a half mirror 302, and is collimated by a collimator lens 321. Thereafter, the light beam forms a laser spot having a diffraction limit size on the optical disk 323 via an objective lens 322. The light reflected by the optical disk 323 is transmitted through the half mirror 302 via the objective lens 322 and the collimator lens 321 again, and is focused on an incident edge 324 of the double mode channel waveguide 334 to form a laser spot here again. Zeroth- and first-order mode light components excited in the double mode channel waveguide 334 by the laser spot propagate through the double mode channel waveguide 334 while they interfere with each other.

A substrate 333 used in the eleventh embodiment is the same as that used in the tenth embodiment. An interdigital electrode 325 having a periodic structure formed on the double mode channel waveguide 334 is a silicon oxide buffer layer, and serves as a TE/TM mode converter. Thereafter, as in the tenth embodiment, the direction of polarization of the zeroth-order mode light which propagates in the TE mode is selectively rotated to the TM mode, and zeroth-order mode light in the TE mode, which is not polarization-converted, zeroth-mode light in the TM mode, and the first-order mode light in the TE mode are excited in two light-distribution channel waveguides 326 and 327. Aluminum rectangular patterns (metal plates) 328 and 329 are arranged on the surfaces of the two light-distribution channel waveguides 326 and 327 without any buffer layer. A polarizer consisting of such a metal plate is well known to those who are skilled in the art, and the metal plate on each optical waveguide selectively absorbs a TM mode light component of light components propagating through the optical waveguide. Therefore, the zeroth-order mode light converted into the TM mode attenuates there. On the other hand the zeroth-order mode light which is not converted from the TE mode, and the first-order mode light reach photodetectors 330 and 331 with almost no attenuation by the metal plates. Note that the aluminum rectangular patterns 328 and 329 may be formed on the double mode channel waveguide 334 between a branch-off region 309 and the in terdigital electrode 325 instead of on the single mode channel waveguides.

In this manner, the output from a subtraction circuit 332 exhibits a high S/N ratio since an offset component is suppressed.

In the eleventh embodiment, TE/TM mode conversion of only the zeroth-order mode light is performed. Alternatively, TE/TM mode conversion of only the first-order mode light may be performed as in the tenth embodiment.

Figure 15:
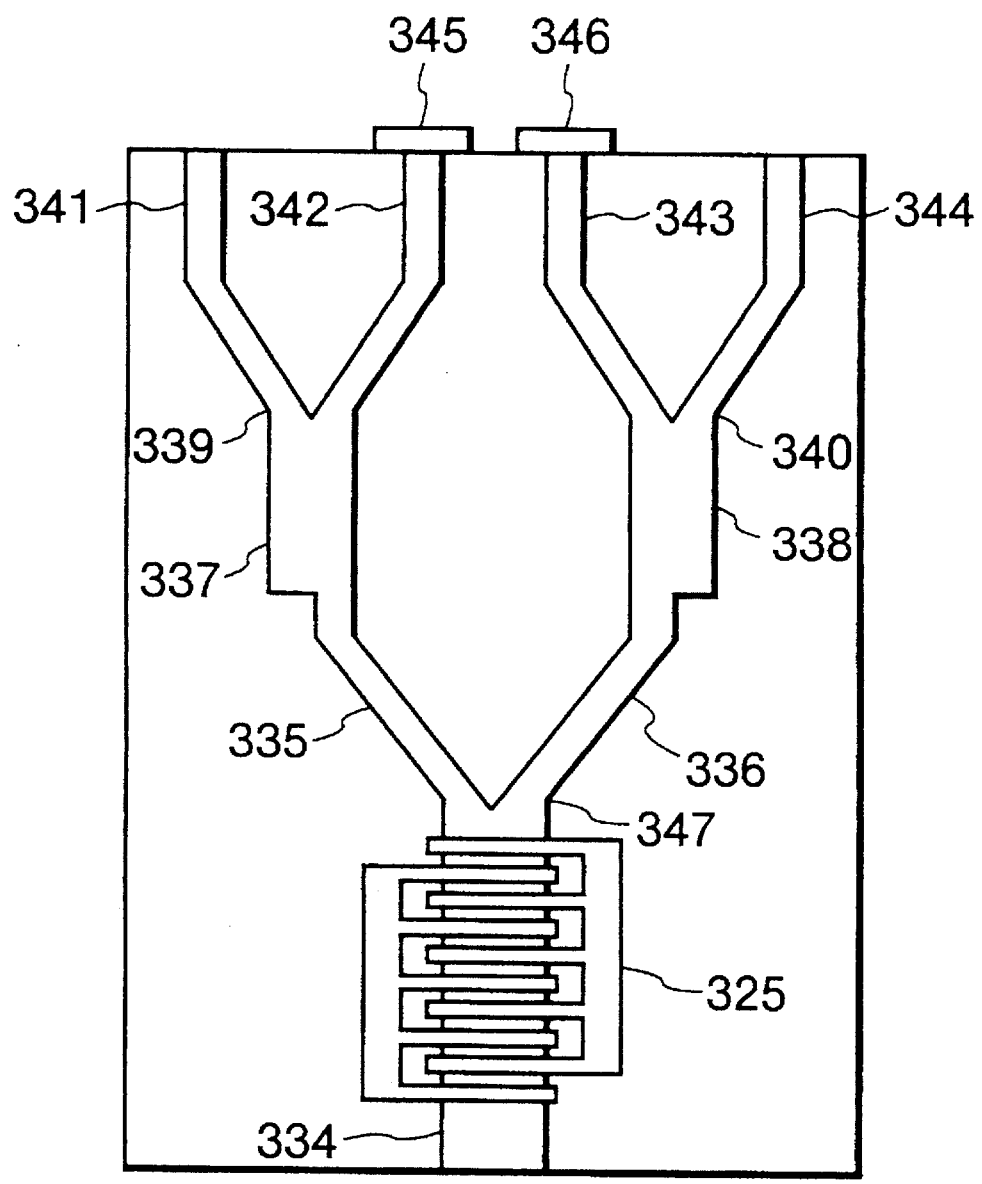
FIG. 15 is a schematic view showing a light information detecting device according to a twelfth embodiment of the present invention.

FIG. 15 is a schematic view showing a light information detecting device according to the twelfth embodiment of the present invention. The light information detecting device of a twelfth embodiment is substantially the same as that of the eleventh embodiment, except for a polarization separation member. Therefore, only the polarization separation member will be explained below. Note that the same reference numerals in this embodiment denote the same parts as in the tenth and eleventh embodiments, and a detailed description thereof will be omitted.

Zeroth-order mode light whose polarization state is converted from the TE mode to the TM mode by an interdigital electrode 325, zeroth-order mode light in the TE mode, and the first-order mode light which remains in the TE mode are distributed into two light-distribution single mode channel waveguides 335 and 336 by a branch-off region 347. The light-distribution single mode channel waveguides 335 and 336 respectively have TE/TM mode separation double mode channel waveguides 337 and 338 (polarization separation double mode channel waveguides) connected thereto. The polarization separation double mode channel waveguides 337 and 338 respectively have branch-off regions 339 and 340 at their output sides, and these branch-off regions respectively branch off to pairs of light-distribution single-moded channel waveguides 341, 342, 343 and 344. Of these four light-distribution single mode channel waveguides 341, 342, 343 and 344, the two inner light-distribution single mode channel waveguides 342 and 343 are provided with photodetectors 345 and 346 at their exit edges.

The length of each of the polarization separation double mode channel waveguides 337 and 338 is selected so that only the TE mode propagates through the inner single mode channel waveguide 342 or 343 in the branch-off region 339 or 340. Such a structure is well known as a TE/TM mode splitter.

With this structure, TE mode light, i.e., zeroth- and first-order mode light components in the TE mode, which propagate through the single mode channel waveguides 335 and 336, selectively reach the photodetectors 345 and 346.

In the twelfth embodiment as well, TE/TM mode conversion may be performed for the first-order mode light as in the tenth and eleventh embodiments.

According to the present invention, the S/N ratio is improved by suppressing zeroth-order mode light. However, as shown in equations (13) and (14), since the signal component is also proportional to the zeroth-order mode, the signal component can no longer be obtained if the zeroth-order mode light is completely suppressed. The S/N ratio is maximized when the overlapping area between an intensity distribution curve 393 of the zeroth-order mode light and an intensity distribution curve 394 of the first-order mode light becomes largest in FIG. 24. Therefore, the zeroth-order mode light must be suppressed to a desired degree. For this purpose, in each of the tenth, eleventh and twelfth embodiments, the degree of suppression of the zeroth-order mode light was adjusted by changing the voltage to be applied to the interdigital electrode 308 or 325 having a periodic structure.

Figure 16:
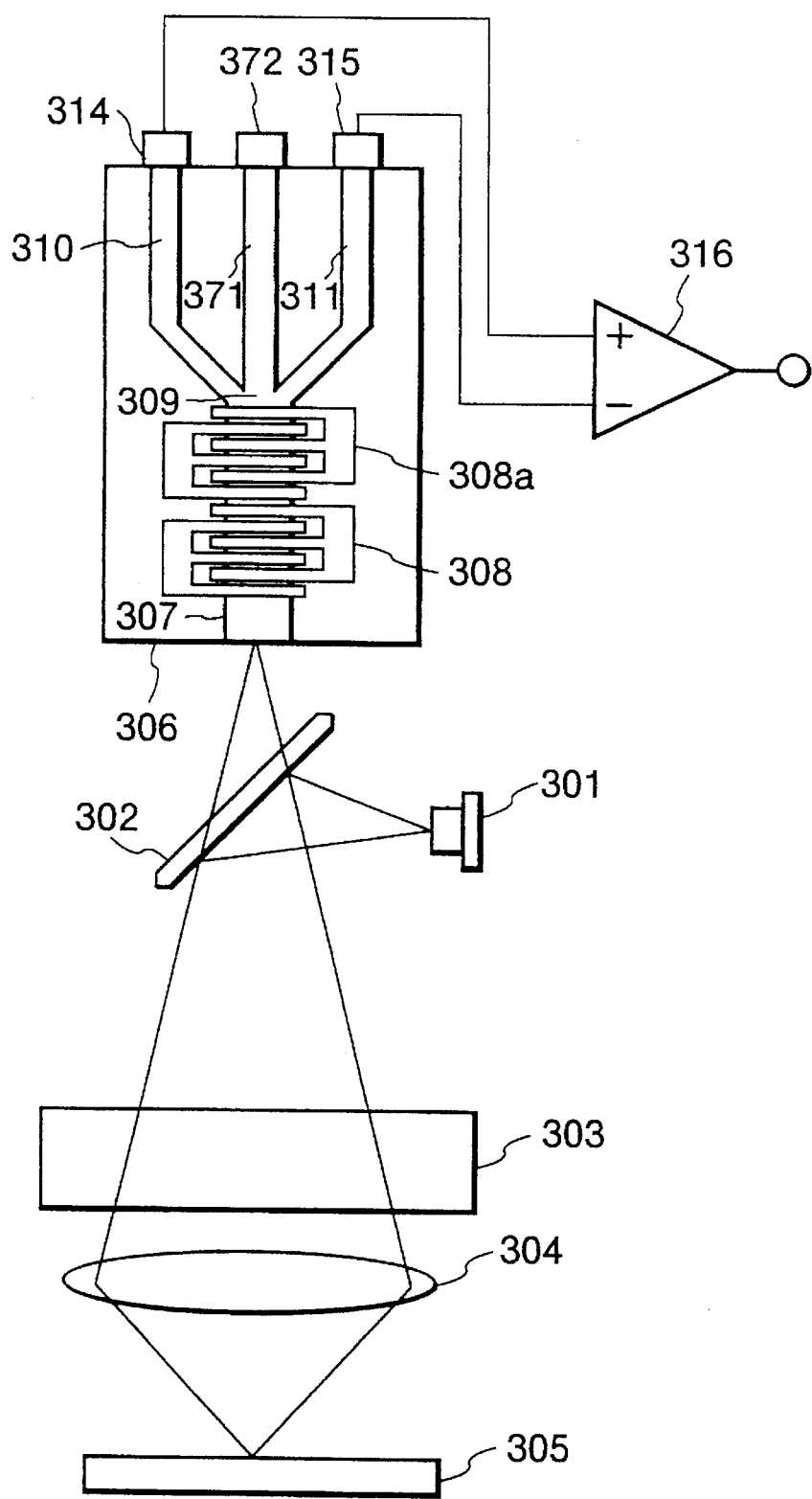
FIG. 16 is a schematic diagram showing a confocal laser scanning mode interference contrast microscope which uses a light information detecting device according to a thirteenth embodiment of the present invention.

FIG. 16 is a schematic diagram showing a confocal laser scanning mode interference contrast microscope which uses a light information detecting device according to a thirteenth embodiment of the present invention. Note that the same reference numerals in this embodiment denote the same parts as in the tenth embodiment, and a detailed description thereof will be omitted.

The confocal laser scanning mode interference contrast microscope shown in FIG. 16 is constituted by a laser light source 301, a half mirror 302, an X–Y scanning means 303 for scanning light emitted from the laser light source 301 toward the surface of a specimen 305, a lens 304, a substrate 306, a double mode channel waveguide 307 formed on the substrate 206, light-distribution single-moded channel waveguides 310, 311 and 371, TE/TM mode converters 308 and 308a, photodetectors 314, 315 and 372, and a subtraction circuit 316. Note that the laser light source 301 comprises a helium neon laser, and the substrate 306 comprises an X-cut Y-propagation lithium niobate substrate. On the other hand, the X–Y scanning means 303 comprises a galvano scanner. However, any other scanning means may be used as long as it can scan a laser beam. For example, a polygonal mirror or the like may be used. The single mode channel waveguides 310 and 311 comprise ones which guide only TE mode light, and the single mode channel waveguide 371 comprises one which guides both TE mode light and TM mode light.

A method of manufacturing the single mode channel waveguides 310, 311 and 371 and the TE/TM mode converters 308 and 308a, which are formed on the substrate 306, will be briefly described below.

The double mode channel waveguide 307 and the light-distribution single mode channel waveguide 371 were formed by thermally diffusing titanium (Ti) on the lithium niobate substrate 306. On the other hand, the light-distribution single mode channel waveguides 310 and 311 were formed by performing proton exchange on the lithium niobate substrate 306. Note that the region formed by thermally diffusing Ti on the lithium niobate substrate serves as an optical waveguide for both ordinary rays (TM mode light in the thirteenth embodiment) and extraordinary rays (TE mode light in the thirteenth embodiment), and the region formed by performing proton exchange on the lithium niobate substrate serves as an optical waveguide for only extraordinary rays (TE mode light in the thirteenth embodiment). The TE/TM mode converters 308 and 308a were formed by depositing A1 after a silicon oxide layer (buffer layer) was formed.

The operation of the confocal laser scanning mode interference contrast microscope according to the thirteenth embodiment will be described below.

Light emitted from the linearly polarized laser light source 301 is reflected by the half mirror 302, and is focused on the surface of the object (specimen 305 to be detected via the X–Y scanning means 303 and the lens 304. The light reflected by the surface on the object 305 to be detected is incident on the incident end face of the double mode channel waveguide 307 via the lens 304, the X–Y scanning means 303, and the half mirror 302 again. The light incident on the double mode channel waveguide 307 excites zeroth- and first-order mode light components in correspondence with a step or a change in reflectance in the spot focused on the object 305 to be detected. The laser light source 301 is arranged, so that light to be exited in the substrate is TM mode light.

Figure 24:
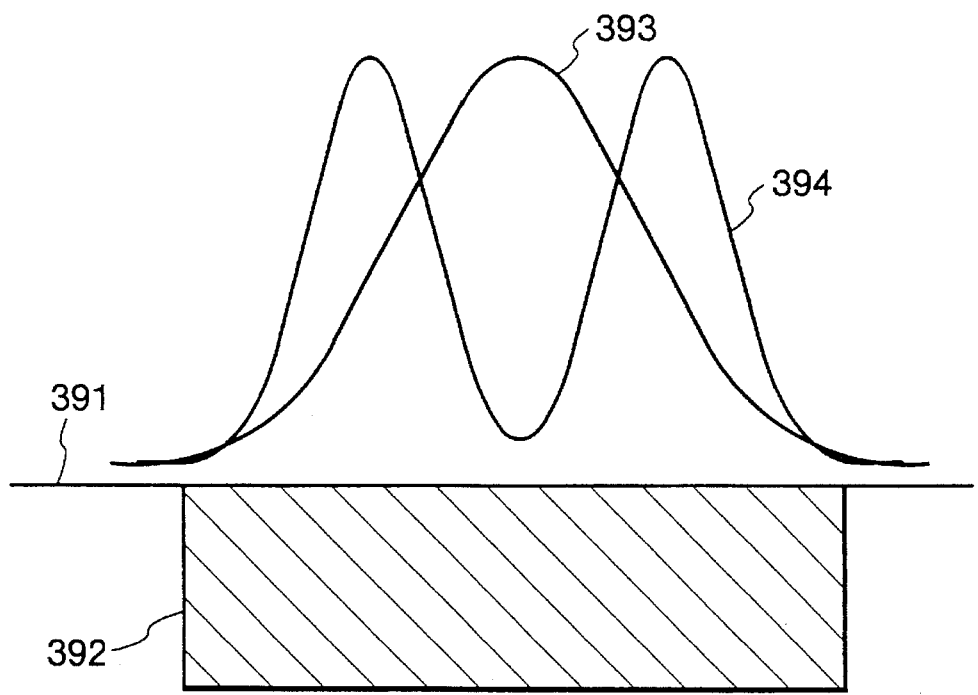
FIG. 24 is a view showing the intensity distributions of zeroth- and first-order modes excited in a double mode channel waveguide.

The substrate 306 used in the thirteenth embodiment is an X-cut Y-propagation lithium niobate substrate, and has an optical anisotropy and an electro-optical effect. Therefore, when voltages are applied to interdigital electrodes 308 and 308a, which are arranged on the double mode channel waveguide 307 and each have a periodic structure, and an electric field is applied to the double mode channel waveguide 307, the interdigital electrode 308 serves as a zeroth-order mode TE/TM mode converter, and the interdigital electrode 308a serves as a first-order mode TE/TM mode converter. By adjusting the voltages to be applied to the interdigital electrodes (TE/TM mode converters) 308 and 308a, the interdigital electrode (TE/TM mode converter) 308 converts some light components (a proper amount) of the zeroth-order mode light into TE mode light, and the interdigital electrode (TE/TM mode converter) 308a converts almost all first order light components into TE mode light. Note that the TE/TM mode conversion amount of the zeroth-order mode light is preferably determined to maximize overlapping area between the intensity distribution curves of the zeroth- and first-order mode light components in the TE mode, as shown in FIG. 24.

The zeroth-order mode light which is TE/TM mode-converted by the interdigital electrode 308 from the TM mode to the TE mode by a proper amount, and the first-order mode light which is TE/TM mode-converted by the interdigital electrode 308a from the TM to TE mode are split into the two outer light-distribution single mode channel waveguides 310 and 311 by a branch-off region 309. On the other hand, the zeroth-order mode light, which is not TE/TM mode-converted, i.e., in the TM mode, is split into the central light-distribution single mode channel waveguide 371. As a result, an output signal from the subtraction circuit 316, which is obtained from the photodetectors 314 and 315 attached to the exit edges of the two light-distribution single mode channel waveguides 310 and 311, exhibits a high S/N ratio since an offset component is suppressed.

In the thirteenth embodiment, the central light-distribution single mode channel waveguide 371 comprises a titanium-indiffused waveguide for guiding light components in both the TE and TM polarization modes. Alternatively, when the waveguide 371 comprises a nickel-indiffused waveguide which guides only the TM mode, the signal component can be detected more efficiently. A method of forming a waveguide which guides only ordinary light (TM mode light in the thirteenth embodiment) by thermally diffusing nickel on the lithium niobate substrate is described in detail in P. -K. Wei and W. -S. Wang, "Novel TE-TM mode splitter on lithium niobate using nickel in-diffusion and proton exchange techniques", Electron. Lett., vol. 30 (1994) 35–37.

In the thirteenth embodiment, the laser light source 30 is arranged, so that light propagating through the optical waveguide is TM mode light before being TE/TM mode-converted by the TE/TM mode converter. Alternatively, when the light source 301 is arranged to obtain TE mode light, the same result can be expected. However, in this case, the two outer ones of the three light-distribution single-mode channel waveguides preferably comprise nickel indiffused waveguides which guide only TM mode light, and the middle light-distribution single mode channel waveguide preferably comprises a proton exchange waveguide which guides only TE mode light.

Figure 17:
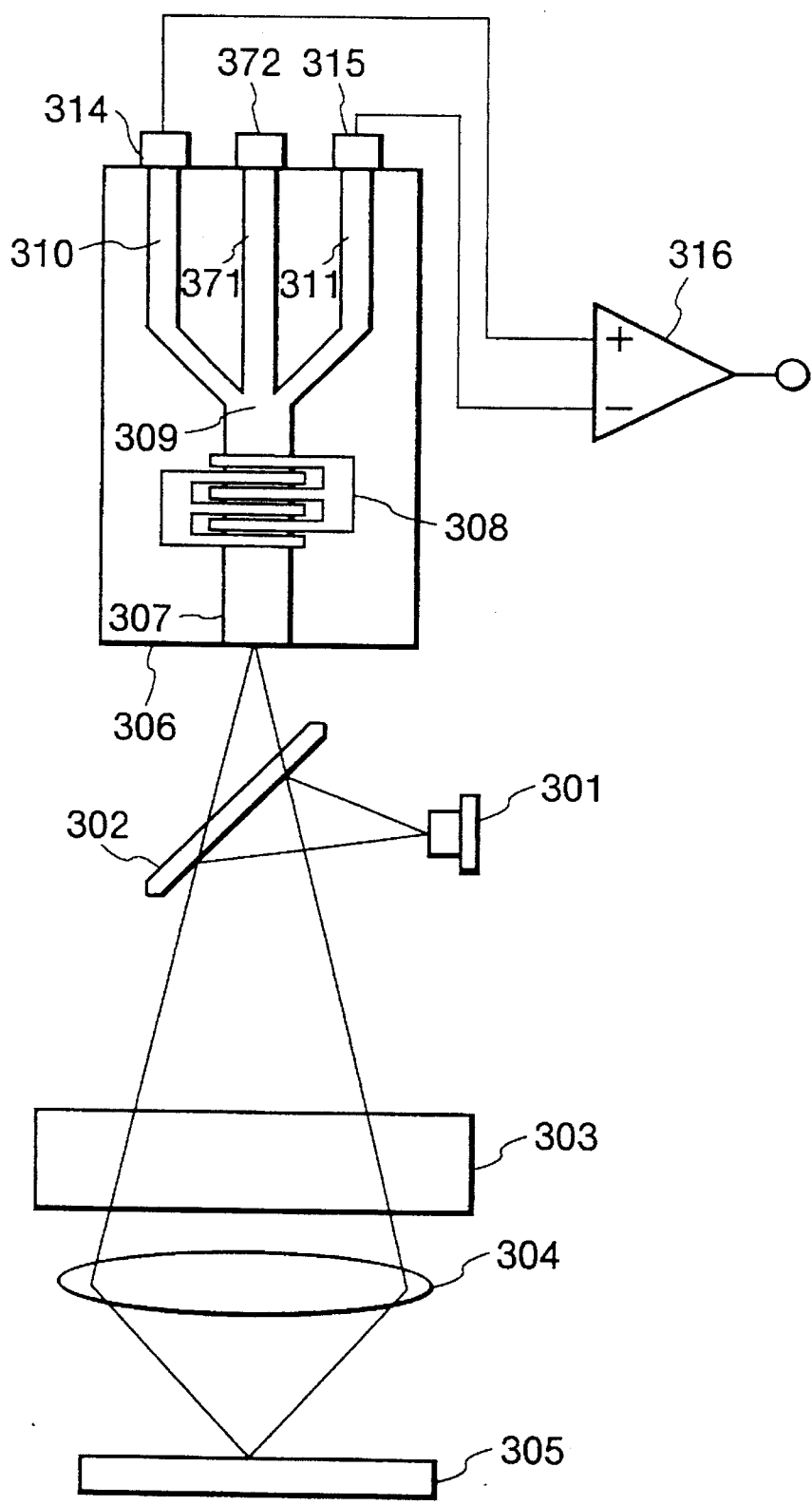
FIG. 17 is a schematic diagram showing a confocal laser scanning mode interference contrast microscope which uses a light information detecting device according to a fourteenth embodiment of the present invention.

FIG. 17 is a schematic diagram showing a confocal laser scanning mode interference contrast microscope which uses a light information detection device according to a fourteenth embodiment of the present invention. Note that the same reference numerals in this embodiment denote the same parts as in the thirteenth embodiment, and a detailed description thereof will be omitted.

The arrangement of the fourteenth embodiment is substantially the same as that of the thirteenth embodiment, and a description of the same parts, and a represents a gradient of amplitude will be omitted. In the thirteenth embodiment, TE/TM mode conversion is performed for both the zeroth- and first-order mode light components which are excited in the double mode channel waveguide by light incident on the double mode channel waveguide 307. However, in the fourteenth embodiment, TE/TM mode conversion is performed for only the zeroth-order mode light.

The operation of the confocal laser scanning mode interference contrast microscope according to the fourteenth embodiment will be described below.

Light emitted from a linearly polarized laser light source 301 is reflected by a half mirror 302, and is focused on the surface of an object 305 to be detected via an X–Y scanning means 303 and a lens 304. The light reflected by the surface of the object 305 to be detected is incident on the incident end face of a double mode channel waveguide 307 via the lens 304, the X–Y scanning means 303, and the half mirror 302 again. The light incident on the double mode channel waveguide 307 excites zeroth- and first-order mode light components in accordance with a step or a change in reflectance in the spot focused on the object 305 to be detected. The laser light source 301 is arranged, so that light to be excited in the substrate is TE mode light unlike in the thirteenth embodiment.

The substrate 306 used in the fourteenth embodiment is an X-cut Y-propagation lithium niobate substrate, and has an optical anisotropy and an electro-optic effect. Therefore, when a voltage is applied to an interdigital electrode 308 which is arranged on the double mode channel waveguide 307 and has a periodic structure, and an electric field is applied to the double mode channel waveguide 307, the interdigital electrode 308 serves as a zeroth-order mode TE/TM mode converter. At this time, by adjusting the voltage to be applied to the interdigital electrode (TE/TM mode converter) 308, the interdigital electrode (TE/TM mode converter) 308 converts some light components (proper amount) of the zeroth-order mode light into TM mode light. Note that the TE/TM mode conversion amount of the zeroth-order mode light is preferably determined to maximize the overlapping area between the intensity distribution curves of the zeroth- and first-order mode light components in the TE mode, as shown in FIG. 24.

The zeroth-order mode light which is not TE/TM mode-converted by the interdigital electrode 308, and the first-order mode light are split into two outer light-distribution single mode channel waveguides 310 and 311 which guide only TE mode light by a branch-off region 309. On the other hand, the zeroth-order mode light which is TE/TM mode-converted from the TE mode to the TM mode by the interdigital electrode 308 is split into a central single mode channel waveguide 371 via the branch-off region 309. As a result, an output signal from the subtraction circuit 316, which is obtained from photodetectors 314 and 315 attached to the exit edges of the two light-distribution single mode channel waveguides 310 and 311, exhibits a high S/N ratio since an offset component is suppressed.

Since the fourteenth embodiment requires only one TE/TM mode converter while the thirteenth embodiment requires two TE/TM mode converters, the fourteenth embodiment involves lower cost than in the thirteenth embodiment, and can simplify the manufacturing process.

In the fourteenth embodiment, when the middle light-distribution single mode waveguide comprises a nickel indiffused waveguide as in the thirteenth embodiment, the signal component can be more efficiently detected. In the fourteenth embodiment, the light source is arranged to obtain TE mode incident light. However, the same effect can be expected if the light source is arranged to obtain TM mode incident light as in the thirteenth embodiment.

Figure 18:
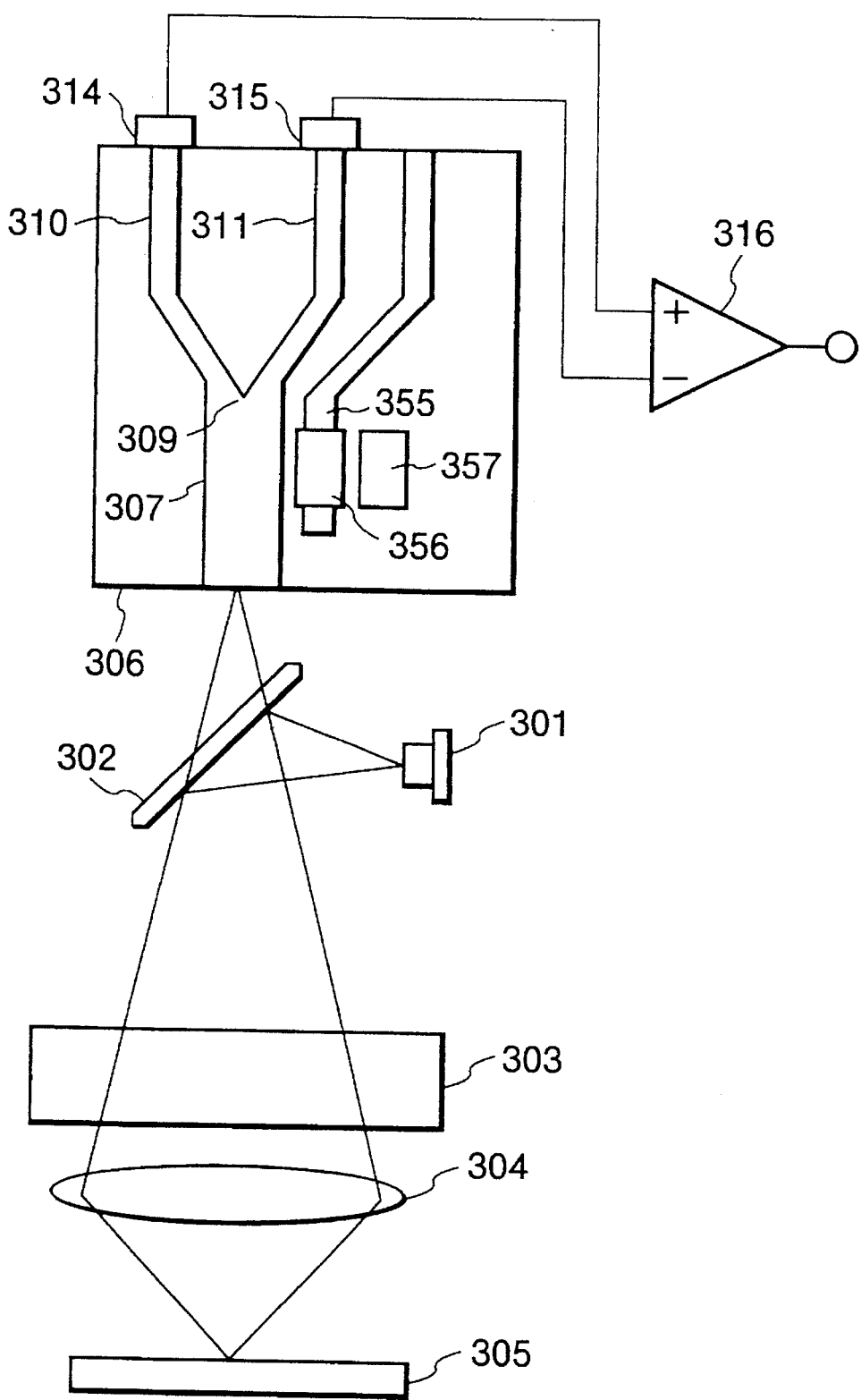
FIG. 18 is a schematic diagram showing a confocal laser scanning mode interference contrast microscope which uses a light information detecting device according to a fifteenth embodiment of the present invention.
Figure 19:
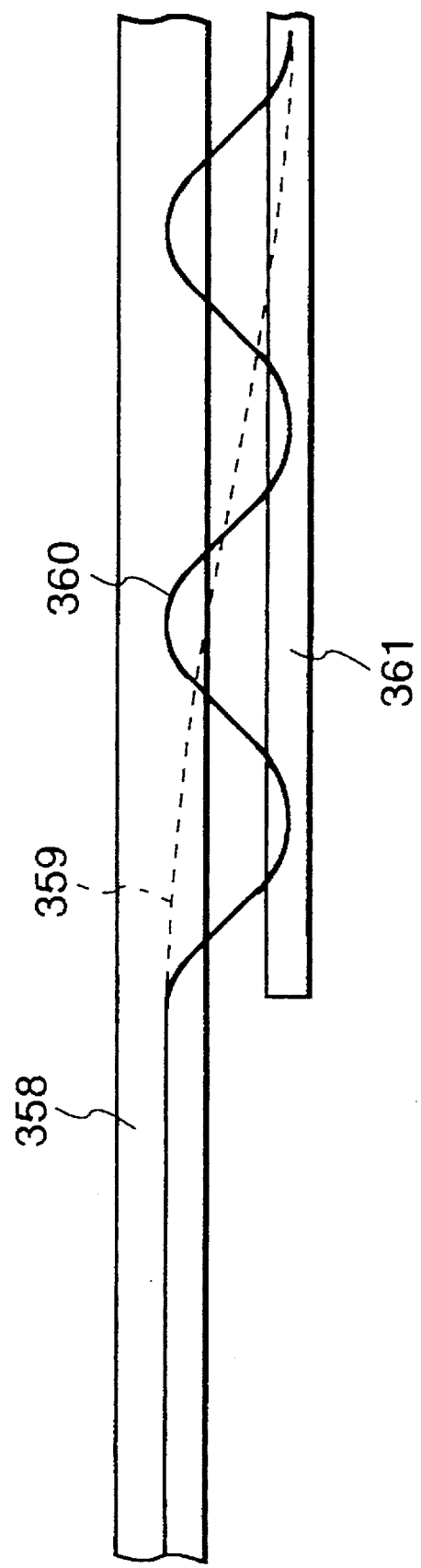
FIG. 19 is an explanatory view showing the principle of power shift between channel waveguides in the fifteenth embodiment of the present invention.

FIG. 18 is a schematic diagram showing a confocal laser scanning mode interference contrast microscope which uses a light information detecting device according to a fifteenth embodiment of the present invention. Note that the same reference numerals in this embodiment denote the same parts as in the tenth embodiment, and a detailed description thereof will be omitted.

In the confocal laser scanning mode interference contrast microscope, light emitted from a linearly polarized laser light source 301 is reflected by a half mirror 302, and is focused on the surface of an object 305 to be detected via an X–Y scanning means 303 and a lens 304. The light reflected by the surface of the object 305 to be detected is transmitted through the lens 304, the X–Y scanning means 303, and the half mirror 302 again, and is incident on the incident end face of a double-mode channel waveguide 307. The double mode channel waveguide 307 and light-distribution single mode channel waveguides 310 and 311 were formed by thermally diffusing titanium on a lithium niobate substrate 306. The light incident on the double mode channel waveguide 307 excites zeroth- and first-order mode light components in accordance with a step or a change in reflectance in the spot focused on the object 305 to be detected.

A coupling channel waveguide 355 is arranged in the vicinity of the double mode channel waveguide 307. Therefore, the zeroth- and first-order mode light components, which propagate through the double mode channel waveguide 307, are respectively coupled to the coupling channel waveguide 355 in a region where the coupling channel waveguide 355 exists, and power shift begins. The coupling channel waveguide 355 is provided with electrodes 356 and 357 via a buffer layer consisting of silicon oxide. The equivalent refractive index of the coupling channel waveguide 355 is almost equal to that of the zeroth-order mode light which propagetes through the double mode channel waveguide 307, and the effective length of the coupling channel waveguide 355 is selected so that almost no first-order mode light power-shifts, and the zeroth-order mode light power-shifts by a desired degree. Therefore, the zeroth-order mode light which propagates through the double mode channel waveguide 307 selectively power-shifts to the coupling channel waveguide 355.

As a result, the zeroth-order mode light which propagates through the double mode channel waveguide 307 is selectively suppressed. The light from which the zeroth-order mode light is selectively suppressed is split into the two light-distribution single mode channel waveguides 310 and 311 by a branch-off region 309. Two photodetectors 314 and 315 connected to the two light-distribution single mode channel waveguides 310 and 311 receive light which has a small offset component and a large signal component. As a result, the output from a subtraction circuit 316 exhibits a high S/N ratio.

As described above, the S/N ratio can be improved by suppressing the zeroth-order mode light.

In the fifteenth embodiment as well, the degree of suppression of the zeroth-order mode light is controlled not to completely suppress the zeroth-order mode light. For this purpose, the equivalent refractive index of the coupling channel waveguide, the interval between the coupling and the double mode channel waveguides, and the length of the coupling channel waveguide can be controlled. When a material having an electro-optic effect is used as the substrate like in the fifteenth embodiment, the electrodes 356 and 357 are preferably arranged, as shown in FIG. 18, so that the voltage applied across the electrodes 356 and 357 is changed to change the effective refractive index and the effective length of the coupling channel waveguide, thereby suppressing the zeroth-order mode light to a desired degree.

In the fifteenth embodiment, the width of the double mode channel waveguide 307 is 8 μm, and the width of the coupling channel waveguide 355 is 3 μm. In addition, the interval between these two waveguides is 2.5 μm.

Figure 20:
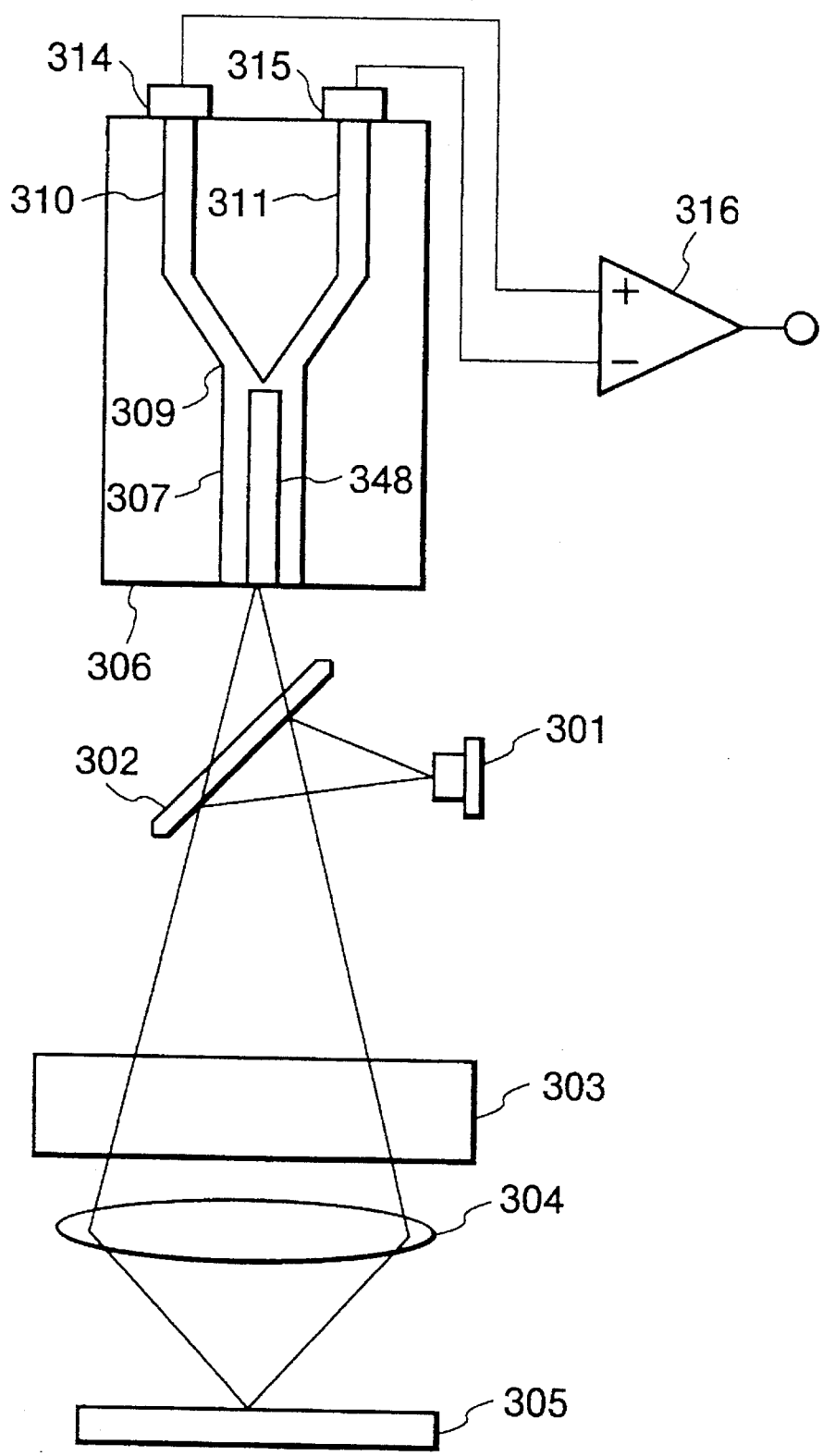
FIG. 20 is a schematic diagram showing a confocal laser scanning mode interference contrast microscope which uses a light information detecting device according to a sixteenth embodiment of the present invention.

FIG. 20 is a schematic diagram showing a confocal laser scanning mode interference contrast microscope which uses a light information detecting device according to a sixteenth embodiment of the present invention. Note that the same reference numerals of the confocal laser scanning mode interference contrast microscope in FIG. 20 denote the same parts as in the tenth embodiment, and a detailed description thereof will be omitted.

In the confocal laser scanning mode interference contrast microscope, light emitted from a linearly polarized laser light source 301 is reflected by a half mirror 302, and is focused on the surface of an object 305 to be detected via an X–Y scanning means 303 and a lens 304. The light reflected by the surface of the object 305 to be detected is transmitted through the lens 304, the X–Y scanning means 303, and the half mirror 302 again, and is incident on the incident end face of a double mode channel waveguide 307, which is formed on an X-cut lithium niobate substrate 306 by thermally diffusing Ti. The light incident on the double mode channel waveguide 307 excites zeroth- and first-order mode light components in accordance with a step or a change in reflectance in the spot focused on the object 305 to be detected.

A stripe-shaped pattern 348 consisting of aluminum (metal plate) is formed on the double mode channel waveguide 307. The aluminum stripe-shaped pattern 348 has a width about ⅓ that of the double mode channel waveguide 307, i.e., 2.5 μm, and has a length of 5 mm. The zeroth- and first-order mode light components excited in the double mode channel waveguide 307 propagate while interfering with each other, and light, which propagates near the center of the double mode channel waveguide 307, is absorbed by the metal plate and attenuates in a region where the stripe-shaped pattern 348 exists. In this case, the zeroth-order mode light strongly attenuates since its high-intensity region overlaps the region where the stripe-shaped pattern 348 exists. On the other hand, the first-order mode light whose high-intensity region has almost no area overlapping the region where the stripe-shaped pattern 348 exists undergoes almost no attenuation.

As a result, the zeroth-order mode light is selectively suppressed. The light from which the zeroth-order mode light is selectively suppressed is split into two light-distribution single mode channel waveguides 310 and 311 by a branch-off region 309. Two photodetectors 314 and 315 connected to the two light-distribution single mode channel waveguides 310 and 311 receive light which has a small offset component and a large signal component. As a result, the output from a subtraction circuit 316 exhibits a high S/N ratio.

In the sixteenth embodiment, since the direction of polarization of the laser light source 301 is arranged to excite the TM mode in the substrate 306, the length of the stripe-shaped pattern 348 can be relatively short.

As shown in FIG. 2, a single mode channel waveguide may be arranged between the light-distribution single mode channel waveguides 310 and 311, and a laser light source may be arranged at the end face of this single mode channel waveguide to emit light. In this case, a polarization control member is preferably arranged between the optical information detection device and the object 305 to be detected, so light propagating through the double mode channel waveguide 307 is a TE mode in the forward path, and is a TM mode in the backward path.

In the sixteenth embodiment as well, the degree of suppression of the zeroth-order mode light is controlled so as not to completely suppress the zeroth-order mode light. For this purpose, the width and length of the stripe-shaped pattern 348 can be changed.

Figure 21:
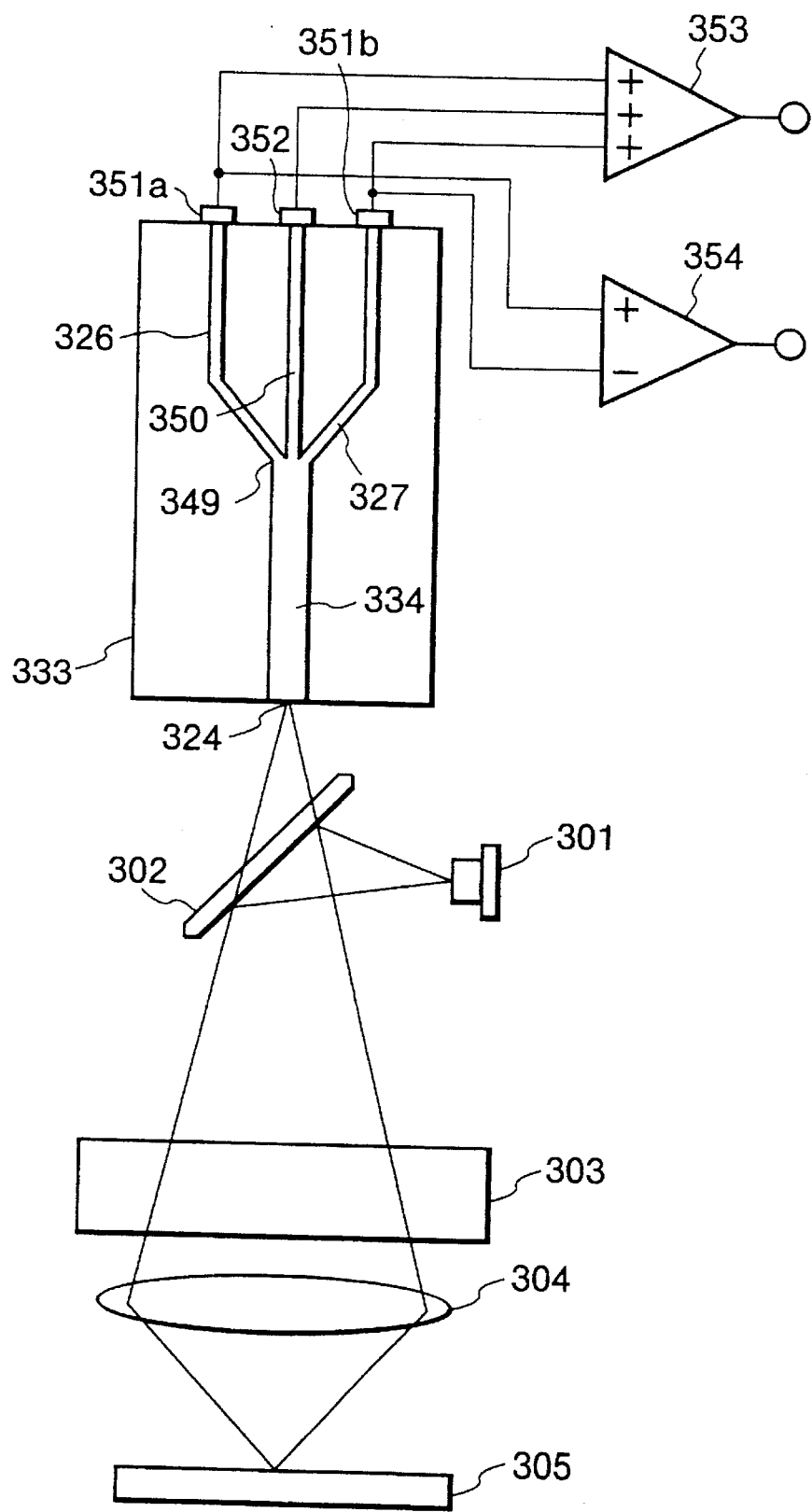
FIG. 21 is a schematic diagram showing a confocal laser scanning mode interference contrast microscope which uses a light information detecting device according to a seventeenth embodiment of the present invention.

FIG. 21 is a schematic diagram showing a confocal laser scanning mode interference contrast microscope which uses a light information detecting device according to a seventeenth embodiment of the present invention.

The arrangement of the seventeenth embodiment is substantially the same as that of the sixteenth embodiment shown in FIG. 20, and a detailed description of the same parts, denoted by the same reference numerals, will be omitted.

In the seventeenth embodiment, a laser beam emitted from a laser light source 301 is reflected by a half mirror 302, and is focused on the surface of object 305 to be detected via an X–Y scanning means 303 and a lens 304. The light reflected by the surface of the object 305 to be detected is incident on an incident end face 324 of a double mode channel waveguide 334 via the lens 304, the X–Y scanning means 303, and the half mirror 302 again. The light incident on the double mode channel waveguide 334 excites zeroth- and first-order mode light components in accordance with a step or a change in reflectance in the spot focused on the object 305 to be detected. The zeroth- and first-order mode light components excited in the double mode channel waveguide 334 reach a branch-off region 349 while interfering with each other. The branch-off region 349 is connected to two light-distribution single mode channel waveguides 326 and 327 connected to photodetectors 351*a* and 351*b*, and a selective removal channel waveguide 350 whose center axis coincides with the center axis of the double mode channel waveguide 334, and which has a width about ⅓ that of the double mode channel waveguide 334. With this width, the first-order mode light is cut off (not excited) in the selective removal channel waveguide 350. Of light components propagating through the double mode channel waveguide 334, most zeroth-order mode light propagates through the selective removal channel waveguide 350 since its high-intensity region falls within the width of the selective removal channel waveguide 350, and only a small amount of zeroth-order mode light propagates through the light-distribution single mode channel waveguides 326 and 327. On the other hand, the first-order mode light does not propagate through the selective removal channel waveguide 350 since it is cut off in the selective removal channel waveguide 350, and propagates through the light-distribution single mode channel waveguides 326 and 327.

As a result, light propagating through the light-distribution single mode channel waveguides 326 and 327 is light which includes a small offset component and a large signal component. Therefore, the output from a subtraction circuit 354, which subtracts signals from the photodetectors 351*a* and 351*b* connected to the light-distribution single mode channel waveguides 326 and 327, exhibits a high S/N ratio. On the other hand, in the arrangement of the seventeenth embodiment, the zeroth-order mode light removed by the selective removal channel waveguide 350 is detected by a photodetector 352, and is added to the outputs from the photodetectors 351*a* and 351*b* by an addition circuit 353. Thus, in the confocal laser scanning mode interference contrast microscope of the seventeenth embodiment, the S/N ratio upon observation of a differential image can be improved without decreasing the light amount upon observation of a bright field image.

As described above, the zeroth-order mode light can be suppressed, and a high S/N ratio can be obtained.

In the seventeenth embodiment as well, the degree of suppression of the zeroth-order mode light is controlled not to completely suppress the zeroth-order mode light. For this purpose, the width of the channel wave guide 350 can be changed.

In each of the tenth to seventeenth embodiments, the effective length (the length of the double mode region) L of the double mode channel waveguide 307 or 334 is set to be a length given by equation (7) when only phase information is to be observed, is set to be a length given by equation (10) when only amplitude information is to be observed, and is set to be a length other than those given by equations (7) and (10) when both the phase information and amplitude information are to be observed.

An electrode for applying an electric field to the double mode channel waveguide 307 or 334 may be arranged, and the length of the double mode region may be changed by applying an electric field to the double mode channel waveguide 307 or 334. With this arrangement, the length of the double mode region can be corrected even when it is shifted from a length with which information of light incident on the double mode channel waveguide is to be measured.

Although not shown in FIGS. 13, 16, 17, 18, 20 and 21, the output from the subtraction circuit 316 or 354 may be input to image control means, and the reflection distribution of light or the step on the object 305 to be detected may be visualized by the image control means. When the light spot formed on the object 305 to be detected is scanned in the X and Y directions by the lens 304 using the X–Y scanning means 303, the position of the light spot may be stored in image control means (not shown), a signal from the subtraction circuit 316 or 354, which signal corresponds to the position of the light spot, may be simultaneously input in the image control means, and the reflection distribution of light or the step on the object 305 to be detected corresponding to the position of the light spot may be visualized, thereby obtaining the entire image of the object to be detected. In the seventeenth embodiment shown in FIG. 21, the output from the addition circuit 353 may also be displayed on a monitor (not shown).

Figure 22:
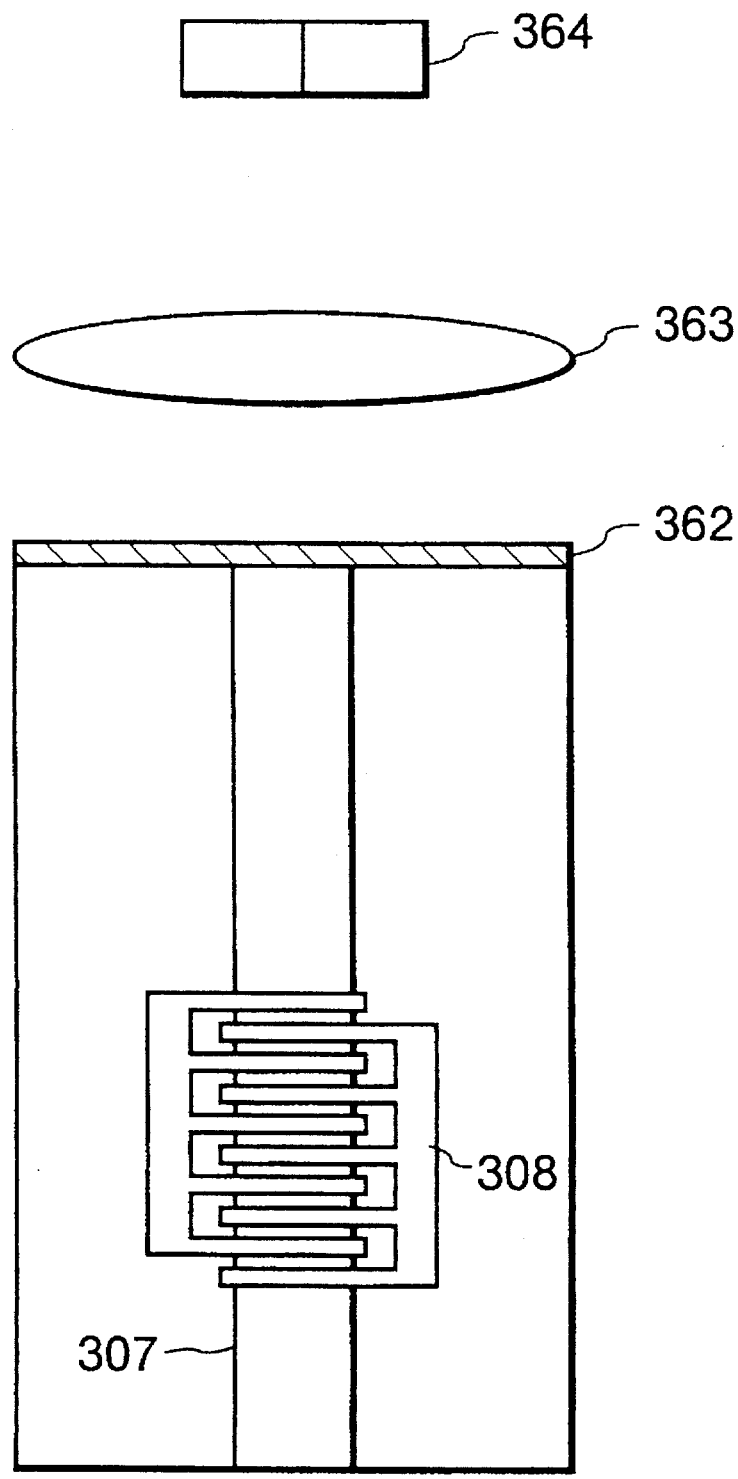
FIG. 22 is a schematic view showing a modification of the light information detecting device according to the tenth embodiment of the present invention.
Figure 23:
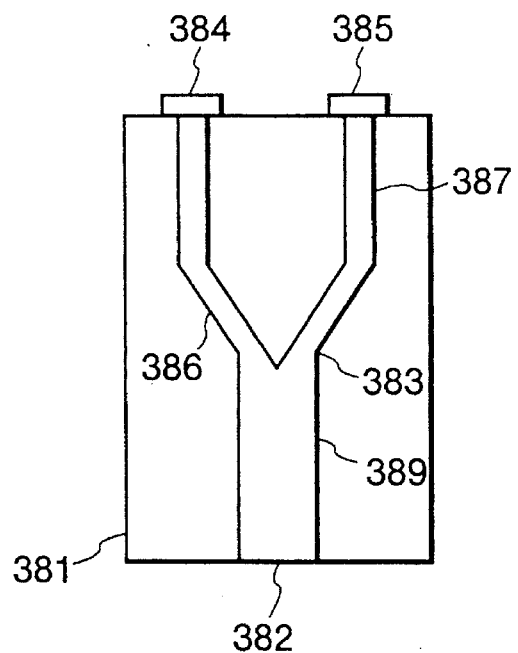
FIG. 23 is a schematic view showing a basic light information detecting device.

In each of the tenth to seventeenth embodiments, light is distributed by the light-distribution single mode channel waveguides 310 and 311; 326 and 327; or 341, 342, 343, and 344. However, the present invention is not limited to the single mode channel waveguides, and double mode or multi mode channel waveguides may be used. In the tenth, fifteenth, and sixteenth embodiments, and the eleventh embodiment, when the aluminum rectangular pattern is arranged on the double mode channel waveguide, light emerging from the double mode channel waveguide may be observed by, e.g., a photodetector without arranging light-distribution single mode channel waveguides like in the conventional optical information detection device. FIG. 22 shows a modification for detecting light emerging from the double mode channel waveguide by a photodetector without arranging the light-distribution single mode chanel waveguide in the tenth embodiment. In FIG. 22, the interdigital electrode 308 is arranged on the double mode channel waveguide 307 as in the tenth embodiment. A polarization plate 362 which selectively transmits TE mode light is arranged at the output edge of the double mode channel waveguide as in the tenth embodiment. TE mode light transmitted through the polarization plate 362 is focused on and detected by a two-segment photodetector 364 by a lens 363. Note that the photodetector need only detect the intensity distribution of light propagating through the double mode channel waveguide, and a PSD, a linear sensor, or the like may be used instead. In FIG. 22, the light emerging from the double mode channel waveguide 307 and transmitted through the polarization plate 362 is focused on the two-segment photodetector 364 by the lens 363. Alternatively, the two-segment photodetector may be directly connected to the polarization plate 362 without arranging the lens 363. With this arrangement as well, the S/N ratio or light information can be remarkably improved as in the tenth embodiment. Also, when an aluminum rectangular pattern is arranged on the double mode channel waveguide in the fifteenth and sixteenth embodiments and the eleventh embodiment, the light emerging from the double mode channel waveguide can be directly detected by the photodetector.

Description will now be made of suitable materials for forming the channel waveguides in the construction of each of the above-described embodiments. Soda glass, Pyrex and molten quartz are known as waveguide substrate materials, but these have no electro-optical effect, and it is difficult to construct a laser diode as a light source and a light receiving element integrally and monolithically. Where use is made of $LiNbO_3$, $LiTaO_3$, GaAs or InP as a substrate, it is possible to form an electrode on the basis of the electro-optical effect of these materials to thereby change the fully coupled length Lc of the double mode waveguide region, and by GaAs and InP, a laser diode LD and a detecting element can be made monolithically integral with each other. When Si is used for a substrate, it is possible to make light receiving elements integral with each other. Including these, the materials of substrates and waveguide layers for forming channel waveguides usable in the present invention can be pigeonholed as follows, and it is preferable to use suitable materials on the basis of the characteristics of the materials.

TABLE

| | Waveguide Structure | |
|---|---|---|
| | Substrate | Waveguide layer |
| Materials capable of forming electrodes | $LiNbO_3$ | Ti-diffused $LiNbO_3$ Proton exchange $LiNbO_3$ ($H_xLi_{1-x}NbO_3$) |
| | $LiTaO_3$ | Nb-diffused $LiTaO_3$ Cu-diffused $LiTaO_3$ $LiNbO_3$ |
| | $Al_2O_3$ | PLZT |
| Materials capable of making light receiving elements integral | $SiO_2$/Si | bariumborosilicate glass $Si_3N_4$ ZnO $Nb_2O_5$ $Ta_2O_5$ $(SiO_2)_x$—$TaO_{2y}$ |
| Materials capable of forming elec- | GaAs | $Ga_{1-x}Al_xAs$ |
| | InP | $In_xGa_{1-x}AsPy$ |

TABLE-continued

| | Waveguide Structure | |
|---|---|---|
| | Substrate | Waveguide layer |
| trodes and making LD and light receiving elements integral | | |
| Materials incapable of forming electrodes and making LD and light receiving elements integral | Soda glass | ion exchange glass polyurethane epoxy photoresist |
| | Pyrex Molten quartz | bariumborosilicate glass PMMA photopolymer |

Each of the above-described embodiments uses an objective lens in common for the illuminating optical system and the condensing optical system, and constitutes a microscope of the so-called epi-illumination type, but of course, the present invention may also be constructed as a so-called transmission type microscope in which an illuminating optical system is disposed on one side of an object to be examined and a condensing optical system is disposed on the other side.

Further, in each of the above-described embodiments, the laser source and photodetectors are exteriorly disposed relative to the waveguide device, but if a silicon substrate is used, the photodetectors can be constructed on the same substrate as the waveguide device, and if a compound semiconductor substrate such as gallium arsenide is used, both of the laser source and the photodetectors can be monolithically integrated on the same substrate as the waveguide, whereby the compactness, lightness of weight and energy saving for adjustment of the apparatus can be further enhanced. However, where it is difficult to construct the laser source and photodetectors integrally with the waveguide device, these may be separately disposed and design may be made such that light is directed by optical fiber or a lens system.

Figure 8:
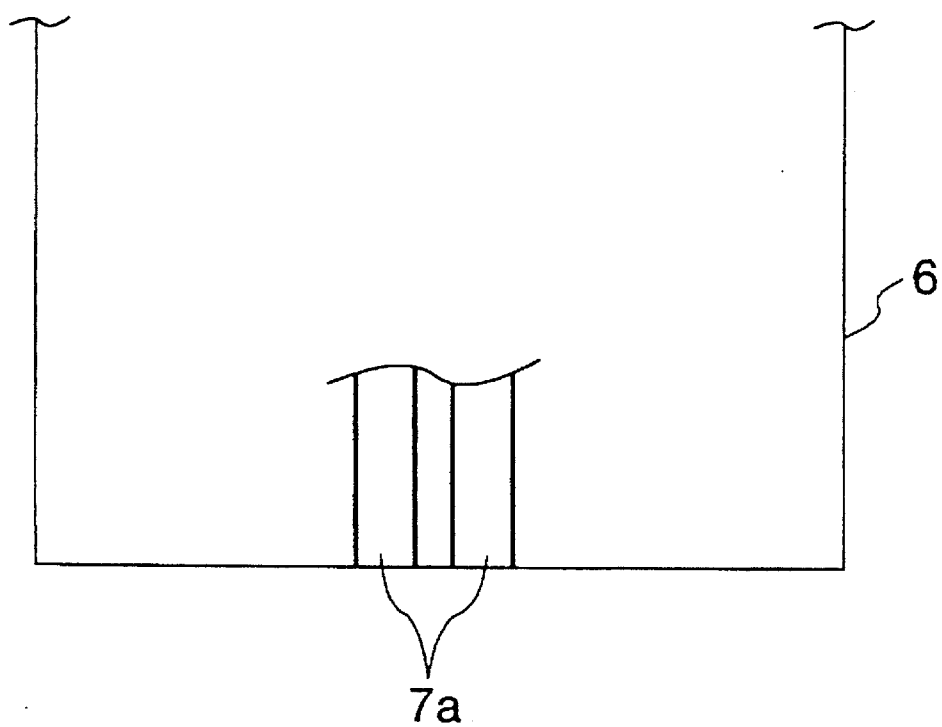
FIG. 8 schematically shows, fragmentarily, a modified arrangement having a channel waveguide composed of two single mode waveguides.

The double mode waveguide may be replaced by two single mode waveguides disposed proximately to each other as indicated diagramatically at 7a in FIG. 8. Further, of course, by applying suitable processing to the differential signal from the light detecting element which detects the intensity of light passing through the two single mode waveguides, there can be obtained images having various contrasts.

In each of the above-described embodiments, a construction in which a light spot is scanned on the object to be examined by an X–Y two-dimensional scanner such as a vibratory mirror or a rotatable mirror is adopted as means for moving the object to be examined and the light spot relative to each other, but alternatively, it is possible to adopt a construction in which the light spot is fixed and a stage on which the object to be examined is placed is scanned. Where the light beam in the optical system is vibrated by a vibratory mirror, a rotatable mirror or the like and the light spot is scanned, it may be impossible due to the influence of the residual aberrations of the optical system to strictly maintain the conjugate relation between the light spot on the object to be examined and the light spot condensed on the light receiving surface of the detecting means (the end surface of the double mode waveguide region), and in such a case, it is preferable to resort to the scanning of the stage.

As described above, according to the present invention, neither any special objective lens nor any special optical element such as a Nomarski prism or a wavelength plate is necessary, and on the basis of a new principle using waveguides, there can be provided a confocal laser scanning mode interference contrast microscope having a compact and simple construction. Also, the construction of the second embodiment shown in FIG. 2 has the advantage that the alignment of the laser source and the light reception side pin-hole which has heretofore been difficult becomes unnecessary. As described in connection with the third embodiment shown in FIG. 3, the phase modulation portion and intensity modulation portion of the object can be taken out independently of each other by changing the length L of the double mode region and the differential images thereof can also be seen. This separation of the phase information and intensity information enhances usefulness of the microscope according to the present invention.

Also, by changing the fully coupled length of the double mode channel waveguides by the utilization of the electro-optical effect of the substrate, it becomes possible to detect the phase modulation portion and intensity modulation portion of the object independently of each other. Moreover, by combining two detecting means, it becomes possible to obtain a differential image in any direction.

The present invention can be implemented with a construction in which the double mode waveguide region is forked into a plurality of channel waveguides. The channel waveguides are not limited to single mode channel waveguides, but can be constructed of any channel waveguides which can direct light. In the construction of the present invention, it is possible to detect the differential information of the object to be examined by the difference signal of the quantities of light passing through the channel waveguides, but of course, where a signal of the sum instead of the difference is taken, the microscope of the present invention functions as an ordinary confocal laser scanning microscope.

What is claimed:

1. A confocal laser scanning mode interference contrast microscope comprising:

a laser source;

illuminating optical means for condensing a light beam from said laser source and forming a light spot on an object to be examined;

condensing optical means for condensing the light beam from said object to be examined on a detecting surface;

detecting means for detecting the light beam condensed on said detecting surface;

said detecting means having a substrate formed with a channel waveguide and two light detecting elements, said channel waveguide having a double mode channel waveguide region an entrance end surface on said detecting surface, and a waveguide fork which forks said double mode region into two channel waveguide regions, said two detecting elements detecting lights propagated through said two channel waveguide regions;

scanning means for moving said object to be examined and said light spot relative to each other; and signal processing means for producing differential information of the object to be examined by detection signals of said detecting elements.

2. A confocal laser scanning mode interference contrast microscope according to claim 1, wherein said signal processing means includes differential means outputting a difference between the signals from said two detecting elements.

3. A confocal laser scanning mode interference contrast microscope according to claim 2, wherein said double mode region of said channel waveguide satisfies one of the following relations:

$$L \approx mLc \ (m=1, 2, \ldots )$$

$$L \approx Lc \ (2m+1)/2, \ (m=0, 1, 2, \ldots )$$

where L is the length of said double mode region, and Lc is the fully coupled length of even and odd modes in said double mode region.

4. A confocal laser scanning mode interference contrast microscope according to claim 2, wherein the substrate of said detecting means has an electro-optical effect and has an electrode provided on said double mode channel waveguide region.

5. A confocal laser scanning mode interference contrast microscope according to claim 4, which is designed such that by applying a voltage to the electrode disposed on said double mode region, the fully coupled length Lc in said double mode region is varied to $Lc_1$ and $Lc_2$ and the following relations are established relative to the a predetermined length L of said double mode region:

$$L \approx mLc_1 (m=1, 2, \ldots )$$

$$L \approx Lc_2 \ (2m+1)/2 \ (m=0, 1, 2, \ldots ).$$

6. A confocal laser scanning mode interference contrast microscope according to claim 2, wherein said substrate is a semiconductor substrate, and said light detecting elements are monolithically formed on said semiconductor substrate with said waveguide.

7. A confocal laser scanning mode interference contrast microscope, comprising:

a substrate formed with a channel waveguide;

said channel waveguide having a double mode channel waveguide region and a waveguide fork which forks said double mode region into three channel waveguide regions;

a laser source for supplying a laser beam from a middle one of said three channel waveguide regions;

optical means for condensing the laser beam passing through said one channel waveguide region and said double mode region to thereby form a light spot on an object to be examined, and condensing the reflected light from said object to be examined on an end surface of said double mode region;

light detecting elements for detecting lights from said object to be examined passed through the outer two of said three channel waveguide regions;

scanning means for moving said object to be examined and said light spot relative to each other; and signal processing means for producing differential information of said object to be examined by detection signals of said detecting elements.

8. A confocal laser scanning mode interference contrast microscope according to claim 7, wherein said signal processing means includes differential means outputting a difference between the signals from said two detecting elements.

9. A confocal laser scanning mode interference contrast microscope according to claim 8, which satisfies one of the following relations:

$$L \approx mLc \ (m=1, 2, \ldots )$$

$$L \approx Lc \ (2m+1)/2 \ (m=0, 1, 2, \ldots ),$$

where L is the length of said double mode region, and Lc is the fully coupled length of even and odd modes in said double mode region.

10. A confocal laser scanning mode interference contrast microscope according to claim 8, wherein the substrate of said detecting means has an electro-optical effect and has an electrode provided on said double mode region.

11. A confocal laser scanning mode interference contrast microscope according to claim 10, which is designed such that by applying a voltage to the electrode disposed on said double mode region, the fully coupled length Lc in said double mode region is varied to $Lc_1$ and $Lc_2$ and the following relations are established relative to a predetermined length L of said double mode region:

$L \simeq mLc_1 (m=1, 2, \ldots)$ $L = Lc_2 (2m+1)/2 \ (m=0, 1, 2, \ldots).$

12. A confocal laser scanning mode interference contrast microscope according to claim 8, wherein said substrate is a semiconductor substrate, and said light detecting elements and said laser source are monolithically formed on said semiconductor substrate with said waveguide.

13. A confocal laser scanning mode interference contrast microscope, comprising:

laser source;

illuminating optical means for condensing a light beam from said laser source and forming a light spot on an object to be examined;

condensing optical means for condensing the light beam from said object to be examined on a detecting surface;

first and second detecting means for detecting the light beam condensed on said detecting surface, said first and second detecting means each having a substrate formed with a channel waveguide and two light detecting elements, said channel waveguide having a double mode channel waveguide region with an entrance end surface on said detecting surface, and a waveguide fork which forks said double mode region into two channel waveguide regions, said two detecting elements detecting lights propagated through said two channel waveguide regions;

light dividing means for separating the light from said object to be examined to said first detecting means and said second detecting means, a widthwise direction of the double mode channel waveguide region of said first detecting means and a widthwise direction of the double mode channel waveguide region of said second detecting means being disposed so as to be orthogonal to each other through said light dividing means; and signal processing means for producing differential information of the object to be examined based on a difference between signals from the two light detecting elements of said first detecting means and a difference between signals from the two light detecting elements of said second detecting means.

14. A confocal laser scanning mode interference contrast microscope according to claim 13, wherein said signal processing means effects signal processing so that a combined signal I of a difference signal $I_1$ from the two light detecting elements of said first detecting means and a difference signal $I_2$ from the two light detecting elements of said second detecting means is $I = I_1 \sin\theta + I_2 \cos\theta$ ($\theta$ is an angle within a range of $0-\pi$).

15. A confocal laser scanning mode interference contrast microscope according to claim 13, further comprising scanning means for moving said object to be examined and said light spot relative to each other.

16. A confocal laser scanning mode interference contrast microscope according to claim 13, wherein the substrate of said first detecting means has a third channel waveguide regions located between said two channel waveguide regions, and the light from said laser source is directed from said double mode region of said first detecting means onto said object by said illuminating optical means through said third channel waveguide region and said fork.

17. A confocal laser scanning mode interference contrast microscope according to claim 13, which satisfies one of the following relations:

$L \simeq mLc \ (m=1, 2, \ldots)$ $L = Lc (2m+1)/2 \ (m=0, 1, 2, \ldots),$ where L is the length of a said double mode region of, and Lc is the fully coupled length of even and odd modes in that double mode region.

18. A confocal laser scanning mode interference contrast microscope according to claim 13, wherein the substrate of at least one of said first detecting means and said second detecting means has an electro-optical effect, and further has an electrode provided for said double mode region thereof, and said microscope has power source means for varying electric power applied to said electrode.

19. A confocal laser scanning mode interference contrast microscope according to claim 18, which is designed such that by applying a voltage to said electrode, the fully coupled length Lc in the double mode region of said one detecting means is varied to $Lc_1$ and $Lc_2$ and $L \simeq mLc_1 \ (m=1, 2, \ldots)$ $L = nc_2 (2m+1)/2 \ (m=0, 1, 2, \ldots)$ are established relative to a predetermined length L of that double mode region.

20. A confocal laser scanning mode interference contrast microscope according to claim 18, wherein, for at least one of said first detecting means and said second detecting means, said substrate is a semiconductor substrate, and said light detecting elements are monolithically formed on said semiconductor substrate with said waveguide.

21. Light information detecting device for detecting information of a light flux condensed on a detecting surface, comprising:

a substrate formed with a first channel waveguide, which has an entrance end surface on a predetermined detecting surface, in which an even mode and an odd mode can be excited in accordance with light incident on the entrance end surface, and which has a predetermined length propagating an excited mode; and a detecting unit for detecting light propagated in said first channel waveguide, and for providing information dependent upon a distribution of light in a widthwise direction of said first channel waveguide by interference between an even mode and an odd mode in said first channel waveguide, said detecting unit including a waveguide fork which is disposed at another end of said first channel waveguide and which forks said first channel waveguide into a plurality of channel waveguides, a plurality of light detectors for detecting light from the plurality of channel waveguides, respectively, and a signal processor for processing outputs from said plurality of light detectors.

22. Light information detecting device according to claim 21, wherein said first channel waveguide satisfies either of the following relations:

$$L \approx mLc \ (m=1, 2, \ldots)$$

$$L \approx Lc(2m+1)/2 \ (m=0, 1, 2, \ldots),$$

where L is the length of said first channel waveguide, and Lc is the fully coupled length in which a phase difference between an even mode and an odd mode in first said channel waveguide is 180°.

23. Light information detecting device according to claim 21, wherein said substrate has an electro-optical effect and has an electrode disposed on said first channel waveguide.

24. Light information detecting device according to claim 23, further comprising power source means for applying an electric voltage to the electrode and wherein, by applying an electric voltage to the electrode, the fully coupled length Lc in which a phase difference between an even mode and an odd mode in said first channel waveguide is 180° is varied to $Lc_1$, and $Lc_2$, and either of the following relations:

$$L \approx mLc_1 \ (m=1, 2, \ldots)$$

$$L \approx Lc_2(2m+1)/2 \ (m=0, 1, 2, \ldots)$$

for a predetermined length L of said first channel waveguide, is established.

25. Light information detecting device according to claim 24, wherein said first channel waveguide is a double mode waveguide.

26. Light information detecting device according to claim 24, wherein said first waveguide having the is two single mode waveguides disposed close to each other.

27. Light information detecting device for detecting information on light flux condensed on a detecting surface, comprising:

a first optical waveguide for exciting an even mode and an odd mode in accordance with light incident on the detecting surface, said first optical waveguide having a predetermined length propagating an excited mode; and a detecting unit for detecting light propagated in said first optical waveguide, and for providing information dependent upon a distribution of light in a widthwise direction of said first optical waveguide by interference between an even mode and an odd mode in said first optical waveguide, said detecting unit including a waveguide fork which is disposed at another end of said first optical waveguide and which forks said first optical waveguide into a plurality of optical waveguides, a plurality of light detectors for detecting light from the plurality of optical waveguides, respectively, and a signal processor for processing outputs from said plurality of light detectors.

28. Light information detecting device according to claim 27, wherein said first optical waveguide satisfies either of the following relations:

$$L \approx mLc \ (m=1, 2, \ldots)$$

$$L \approx Lc(2m+1)/2 \ (m=0, 1, 2, \ldots),$$

where L is the length of said first optical waveguide, and Lc is the fully coupled length in which a phase difference between an even mode and an odd mode in said first optical waveguide is 180°.

29. Light information detecting device according to claim 27, wherein said first optical waveguide is a light channel waveguide formed on a substrate which has an electro-optical effect and has an electrode disposed on the light channel waveguide.

30. Light information detecting device according to claim 29, further comprising power source means for applying an electric voltage to the electrode disposed on the light channel waveguide, and wherein, by applying an electric voltage to the electrode disposed on the light channel waveguide, the fully coupled length Lc in which a phase difference between an even mode and an odd mode in the light channel waveguide is 180° is varied to $Lc_1$ and $Lc_2$, and either of the following relations:

$$L \approx mLc_1 \ (m=1, 2, \ldots)$$

$$L \approx Lc_2 \ (2m+1)/2 \ (m=0, 1, 2, \ldots)$$

for a predetermined length L of the light channel waveguide, is established.

31. Light information detecting method for detecting information of a light flux condensed on a detecting face at an end of a first optical waveguide, comprising:

a step for exciting an even mode and an odd mode in accordance with light incident on the detecting face at said end of said first optical waveguide and propagating an excited mode along a predetermined length of said first optical waveguide; and a step for detecting light propagated in said first optical waveguide, and for providing information dependent upon a distribution of light in a widthwise direction of said first optical waveguide by interference between an even mode and an odd mode in said first optical waveguide, said detecting step including forking another end of said first optical waveguide into a plurality of optical waveguides, detecting light from the plurality of optical waveguides by a plurality of light detectors corresponding to the plurality of optical waveguides, respectively, and processing outputs from said light detectors.

32. Light information detecting method according to claim 31, wherein said first optical waveguide satisfies either of the following relations:

$$L \approx mLc \ (m=1, 2, \ldots)$$

$$L \approx Lc \ (2m+1)/2 \ (m=0, 1, 2, \ldots)$$

where L is the length of said first optical waveguide, and Lc is the fully coupled length of even and odd modes in said first optical waveguide.

33. Light information detecting method according to claim 31, further comprising a step for varying, based on an electro-optical effect of said first optical waveguide, an optical length of said first optical waveguide by applying an electric voltage to said first optical waveguide.

34. Light information detecting method according to claim 33, wherein said step for varying the optical length of said first optical waveguide includes a step for, by applying an electric voltage to an electrode disposed on said first optical waveguide, varying the fully coupled length Lc in which a phase difference between an even mode and an odd mode in said first optical waveguide is 180° to $Lc_1$ and $Lc_2$ and satisfying either of the following relations:

$L \simeq mLc_1$ $(m=1, 2, \ldots)$ $$L \simeq Lc_2 (2m+1)/2 \ (m=0, 1, 2, \ldots)$$

for a predetermined length L of said first optical waveguide.

35. Light information detecting device for detecting information of light flux condensed on a detecting surface, comprising:

a main optical waveguide of a predetermined length for exciting an even mode and an odd mode in accordance with light incident on a first end surface of the main optical waveguide and propagating an excited mode toward a second end surface of the main optical waveguide;

a middle optical waveguide disposed at the second end surface of said main optical waveguide;

first and second side optical waveguides disposed, with said middle optical waveguide being located therebetween, at the second end surface of said main optical waveguide;

light source means for supplying illumination light through said middle optical waveguide to said main optical waveguide and from the first end surface of said main optical waveguide to a detection surface; and light detecting means for detecting, respectively, lights passing through the first and second side optical waveguides in accordance with a mode excited in said main optical waveguide.

36. Light information detecting device according to claim 35, wherein said main optical waveguide satisfies either of the following relations:

$L \simeq mLc$ $(m=1, 2, \ldots)$ $$L \simeq Lc (2m+1)/2 \ (m=0, 1, 2, \ldots),$$

where L is the length of said main optical waveguide, and Lc is the fully coupled length in which a phase difference between an even mode and an odd mode in said main optical waveguide is 180°.

37. Light information detecting device according to claim 36, wherein said main optical waveguide is a light channel waveguide formed on a substrate which has an electro-optical effect and has an electrode provided on the light channel waveguide.

38. Light information detecting device for detecting information on light flux condensed on a detecting surface, comprising:

an optical waveguide for exciting an even mode and an odd mode in accordance with light incident on the detecting surface, the optical waveguide having a predetermined length propagating an excited mode; and a detecting unit for dividedly detecting light from different widthwise portions of said optical waveguide to provide information dependent upon a distribution of light in the widthwise direction of said optical waveguide by interference between an even mode and an odd mode in said optical waveguide.

39. Light information detecting device according to claim 38, wherein said optical waveguide satisfies either of the following relations:

$L \simeq mLc$ $(m=1, 2, \ldots)$ $L \simeq Lc (2m+1)/2$ $(m=0, 1, 2, \ldots)$, where L is the length of said optical waveguide, and Lc is the fully coupled length in which a phase difference between an even mode and an odd mode in said optical waveguide is 180°.

40. Light information detecting device according to claim 39, wherein said optical waveguide is a light channel waveguide formed on a substrate which has an electro-optical effect and has an electrode provided on the light channel waveguide.

41. Light information detecting method for detecting information of a light flux condensed on a detecting face at an end of an optical waveguide, comprising:

a step for exciting an even mode and an odd mode in accordance with light incident on the detecting face at said end of said optical waveguide and propagating an excited mode along a predetermined length of said optical waveguide; and a step for dividedly detecting light from different widthwise portions of said optical waveguide and outputting a detection result providing information dependent upon a distribution of light in a widthwise direction of said optical waveguide by interference between an even mode and an odd mode in said optical waveguide.

42. Light information detecting method according to claim 41, wherein said optical waveguide satisfies either of the following relations:

$L \simeq mLc$ $(m=1, 2, \ldots)$ $$L \simeq Lc (2m+1)/2 \ (m=0, 1, 2, \ldots),$$

where L is the length of said optical waveguide, and Lc is the fully coupled length of even and odd modes in said optical waveguide.

43. Light information detecting method according to claim 42, further comprising a step for varying, based on an electro-optical effect of said optical waveguide, an optical length of said optical waveguide by applying an electric voltage to said optical waveguide.

44. Light information detecting device, comprising:

a substrate;

a double mode channel waveguide formed on said substrate, said double mode channel waveguide having an incident end face which receives incident light, and zeroth-order mode light and first-order mode light being excited in said double mode channel waveguide in accordance with light incident on said incident end face;

a photodetecting portion for detecting an intensity distribution of light propogating through said double mode channel waveguide; and a device for selectively removing the zeroth-order mode light excited in said double mode channel waveguide.

45. Light information detecting device according to claim 44, further comprising:

a branch-off region which splits light propagating through said double mode channel waveguide and is formed on said substrate; and two light-distribution channel waveguides which guide light components split by said branch-off region, and are formed on said substrate, and wherein said photodetecting portion detects light components respectively emerging from said two light-distribution channel waveguides.

46. Light information detecting device according to claim 44, wherein said selective removing device includes:

a TE/TM mode converter which is arranged on said double mode channel waveguide and performs selective TE/TM mode conversion of a direction of polarization of the zeroth-order mode light excited in said double mode channel waveguide; and a polarization separation device which is arranged between said TE/TM mode converter and said photodetecting portion and blocks the zeroth-order mode light which is TE/TM mode-converted by said TE/TM mode converter, so that the blocked zeroth-order mode light does not reach said photodetecting portion.

47. Light information detecting device according to claim 46, wherein said TE/TM mode converter comprises an electrode which is arranged on said double mode channel waveguide, and has a periodic structure.

48. Light information detecting device according to claim 46, wherein said polarization separation device comprises a polarization plate which is arranged in front of said photodetecting portion.

49. Light information detecting device according to claim 46, wherein said polarization separation device comprises a metal plate which is arranged on said double mode channel waveguide.

50. Light information detecting device according to claim 46, further comprising:

a branch-off region which splits light propagating through said double mode channel waveguide and is formed on said substrate; and two light-distribution channel waveguides which guide light components split by said branch-off region and are formed on said substrate, and wherein said polarization separation device includes a polarization plate arranged in front of said photodetecting portion, and said photodetecting portion detects light components respectively emerging from said two light-distribution channel waveguides.

51. Light information detecting device according to claim 46, further comprising:

a branch-off region which splits light propagating through said double mode channel waveguide and is formed on said substrate; and two light-distribution channel waveguides which guide light components split by said branch-off region and are formed on said substrate, and wherein said polarization separation device includes metal plates respectively arranged on said two light-distribution channel waveguides, and said photodetecting portion detects light components respectively emerging from said two light-distribution channel waveguides.

52. Light information detecting device according to claim 46, further comprising:

a first branch-off region which splits light propagating through said double mode channel waveguide and is formed on said substrate; and two first light-distribution channel waveguides which guide light components split by said first branch-off region and are formed on said substrate, wherein said polarization separation device includes:

two polarization separation double mode channel waveguides which are respectively connected to said first light-distribution channel waveguides, have predetermined lengths, and are formed on said substrate;

two second branch-off regions which respectively split light components propagating through said polarization separation double mode channel waveguides and are formed on said substrate; and two pairs of second light-distribution channel waveguides which respectively guide light components split by said second branch-off regions and are formed on said substrate, and wherein said photodetecting portion detects light components emerging from two of said second light-distribution channel waveguides which guide light including the first-order mode light.

53. Light information detecting device according to claim 44, wherein said selective removing device comprises a coupling channel waveguide which is formed on said substrate, is arranged in the vicinity of and to be substantially parallel to said double mode channel waveguide, and can be coupled to the zeroth-order mode light propagating through said double mode channel waveguide.

54. Light information detecting device according to claim 53, wherein an effective refractive index of said coupling channel waveguide with respect to light propagating therethrough is substantially equal to an effective refractive index of said double mode channel waveguide with respect to the zeroth-order mode light propagating therethrough.

55. Light information detecting device according to claim 53, wherein said substrate has an electro-optic effect, and an electrode for applying an electric field to said coupling channel waveguide is arranged on or in the vicinity of said coupling channel waveguide.

56. Light information detecting device according to claim 55, further comprising:

a branch-off region which splits light propagating through said double mode channel waveguide and is formed on said substrate; and two light-distribution channel waveguides which guide light components split by said branch-off region and are formed on said substrate, and wherein said photodetecting portion detects light components respectively emerging from said two light-distribution channel waveguides.

57. Light information detecting device according to claim 44, further comprising:

a branch-off region which splits light propagating through said double mode channel waveguide and is formed on said substrate;

three light-distribution channel waveguides which guide light components split by said branch-off region and are formed on said substrate, wherein said selective removing device includes:

a first TE/TM mode converter which is arranged on said double mode channel waveguide, and performs selective TE/TM mode conversion of a direction of polarization of the zeroth-order mode light excited in said double mode channel waveguide, and a second TE/TM mode converter which is arranged on said double mode channel waveguide, and performs selective TE/TM mode conversion of a direction of polarization of the first-order mode light excited in said double mode channel waveguide, and wherein said photodetecting portion detects respective light components emerging from at least two outer light-distribution channel waveguides of said three light-distribution channel waveguides, and the two outer light-distribution channel waveguides guide only light which has a direction of polarization perpendicular to a direction of polarization of light incident on said double mode channel waveguide.

58. Light information detecting device according to claim 57, wherein a middle light-distribution channel waveguide of said three light-distribution channel waveguides guides only light which has a direction of polarization perpendicular to the direction of polarization of light propagating through the two outer light-distribution channel waveguides.

59. Light information detecting device according to claim 44, further comprising:

a branch-off region which splits light propagating through said double mode channel waveguide and is formed on said substrate; and three light-distribution channel waveguides which guide light components split by said branch-off region and are formed on said substrate, and wherein said selective removing device includes a TE/TM mode converter which is arranged on said double mode channel waveguide, and which performs selective TE/TM mode conversion of a direction of polarization of the zeroth-order mode light excited in said double mode channel waveguide, said photodetecting portion detects respective light components emerging from at least two outer light-distribution channel waveguides of said three light-distribution channel waveguides, and the two outer light-distribution channel waveguides guide only light which has the same direction of polarization as a direction of polarization of light incident on said double mode channel waveguide.

60. Light information detecting device according to claim 59, wherein a middle light-distribution channel waveguide of said three light-distribution channel waveguides guides only light which has a direction of polarization perpendicular to the direction of polarization of light propagating through the two outer light-distribution channel waveguides.

61. Light information detecting device, comprising:

a substrate;

a double mode channel waveguide formed on said substrate, said double mode channel waveguide having an incident end face which receives incident light, and zeroth-order mode light and first-order mode light being excited in said double mode channel waveguide in accordance with light incident on said incident end face;

a photodetecting portion for detecting an intensity distribution of light propagating through said double mode channel waveguide; and a device for selectively removing light which propagates near a center of said double mode channel waveguide.

62. Light information detecting device according to claim 61, further comprising:

a branch-off region which splits light propagating through said double mode channel waveguide and is formed on said substrate; and two light-distribution channel waveguides which guide light components split by said branch-off region, and are formed on said substrate, and wherein said photodetecting portion detects light components respectively emerging from said two light-distribution channel waveguides.

63. Light information detecting device according to claim 61, wherein said selective removing device comprises a stripe-shaped metal plate which has a width smaller than a width of said double mode channel waveguide, and which is arranged on a surface of said double mode channel waveguide so that a center axis thereof coincides with a center axis of said double mode channel waveguide.

64. Light information detecting device according to claim 61, wherein said selective removing device comprises a selective removal channel waveguide which has a width smaller than a width of said double mode channel waveguide, and is connected to said double mode channel waveguide so that a center axis thereof coincides with a center axis of said double mode channel waveguide.

65. Light information detecting device according to claim 64, wherein the width of said selective removal channel waveguide is a width with which the first-order mode light propagating through said double mode channel waveguide is cut off.

66. Light information detecting device according to claim 64, further comprising a photodetector for detecting light emerging from said selective removal channel waveguide.

67. Light information detecting device according to claim 63, further comprising:

a branch-off region which splits light propagating through said double mode channel waveguide and is formed on said substrate; and two light-distribution channel waveguides which guide light components split by said branch-off region and are formed on said substrate, and wherein said photodetecting portion detects light components respectively emerging from said two light-distribution channel waveguides.

68. Light information detecting device according to claim 64, further comprising:

a branch-off region which splits light propagating through said double mode channel waveguide and is formed on said substrate;

two light-distribution channel waveguides which guide light components split by said branch-off region, and are formed on said substrate; and a photodetector for detecting light emerging from said selective removal channel waveguide, and wherein the width of said selective removal channel waveguide is a width with which the first-order mode light propagating through said double mode channel waveguide is cut off, and said photodetecting portion detects light components respectively emerging from said two light-distribution channel waveguides.

69. An apparatus for measuring a minute step height on an object to be examined, comprising:

a laser source;

an illuminating optical system for focusing a light beam from said laser source and forming a light spot on said object;

a focusing optical system for condensing the light beam from said object on a detecting surface; and detecting means for detecting the light beam focused on said detecting surface a said detecting means having;

a substrate formed with a channel waveguide which includes a double mode channel waveguide region having an entrance end on said detecting surface and at least two branch channel waveguide regions branched from said double mode region, respective detecting elements for detecting lights propagated through said branch channel waveguide regions, adding means for obtaining a sum of signals from said detecting elements, subtracting means for obtaining a difference of signals from said detecting elements, and calculating means for outputting data of said minute step height on said object based on outputs of said adding means and said subtracting means.

70. An apparatus according to claim 69, wherein when a fully coupled length of both modes in said double mode region is Lc, the length of said double mode region L is given by $$L=Lc\ (2m+1)/2\ (m=0, 1, 2, \ldots).$$

71. An apparatus according to claim 70, further comprising scanning means for relatively shifting the light spot with respect to the object.

72. An apparatus according to claim 71, wherein said calculating means obtains the minute step height on said object based on output data $W(s_0)$ of said adding means and output data $S(s_0)$ of said subtracting means by the following equation:

$$\phi_0 = C_p \cdot S(s_0)/W(s_0),$$

wherein $C_p$ is an eigen constant of said apparatus.

73. A method of measuring a minute step height on an object to be examined, comprising the steps of:

forming a light spot on said object by focusing a light beam from a laser source;

focusing the light beam from said object on a detecting surface; and detecting the light beam focused on said detecting surface;

said detecting step including the steps of:

detecting intensity of lights which are propagated from an entrance end of said detecting surface through a double mode channel waveguide region and at least two branch channel waveguide regions branched from said double mode channel waveguide region;

obtaining a difference and a sum of signals of the respective intensities; and calculating a signal of said minute step height on the object based on a signal of the difference and a signal of the sum.

74. A method according to claim 73, wherein when a fully coupled length of both modes in said double mode region is Lc, a length of said double mode region L is given by $$L=Lc\ (2m+1)/2\ (m=0, 1, 2, \ldots).$$

75. A method according to claim 74, further comprising the step of relatively shifting said light spot with respect to said object.

76. A method according to claim 75, wherein said calculating step obtains the minute step height $\phi_0$ on said object based on difference signal data $S(s_0)$ and sum signal data $W(s_0)$ by the following equation:

$$\phi_0 = C_p \cdot S(s_0)/W(s_0),$$

wherein $C_p$ is an eigen constant of an apparatus for performing said method.

* * * * *